United States Patent
Tashiro

(10) Patent No.: US 10,310,255 B2
(45) Date of Patent: Jun. 4, 2019

(54) ZOOM LENS AND IMAGE PICKUP APPARATUS INCLUDING THE SAME

(71) Applicant: CANON KABUSHIKI KAISHA, Tokyo (JP)

(72) Inventor: Yoshihisa Tashiro, Nikko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 738 days.

(21) Appl. No.: 14/965,029

(22) Filed: Dec. 10, 2015

(65) Prior Publication Data
US 2016/0195703 A1 Jul. 7, 2016

(30) Foreign Application Priority Data
Jan. 7, 2015 (JP) ................... 2015-001439

(51) Int. Cl.
G02B 15/163 (2006.01)
G02B 27/00 (2006.01)
G02B 15/173 (2006.01)

(52) U.S. Cl.
CPC ....... *G02B 27/0025* (2013.01); *G02B 15/163* (2013.01); *G02B 15/173* (2013.01)

(58) Field of Classification Search
CPC ........ G02B 15/14; G02B 15/15; G02B 15/16; G02B 15/163; G02B 15/167; G02B 15/173; G02B 13/009
USPC ................. 359/676–679, 683–687, 689, 690
See application file for complete search history.

(56) References Cited

U.S. PATENT DOCUMENTS

| | | | |
|---|---|---|---|
| 5,691,851 A | 11/1997 | Nishio et al. | |
| 7,649,693 B2 | 1/2010 | Kuroda et al. | |
| 8,670,187 B2 | 3/2014 | Mitsuhashi | |
| 8,786,714 B2 | 7/2014 | Kim et al. | |
| 8,873,155 B2 | 10/2014 | Kimura | |
| 2008/0259464 A1* | 10/2008 | Kuroda | G02B 15/173 359/686 |

(Continued)

FOREIGN PATENT DOCUMENTS

CN 100520482 C 7/2009
JP S58179809 A 10/1983

(Continued)

OTHER PUBLICATIONS

Office Action issued in Chinese Appln. No. 201610003578.1 dated Mar. 22, 2018. English translation provided.

*Primary Examiner* — Darryl J Collins
(74) *Attorney, Agent, or Firm* — Rossi, Kimms & McDowell LLP

(57) ABSTRACT

A zoom lens including: a positive first lens unit; a negative second lens unit; and a positive rear lens group, an interval of adjacent lens units is changed during zooming, the rear lens group includes from an object side: a positive lens system; an aperture stop; and a negative partial lens system, the first lens unit and the aperture stop are positioned closer to the object side at a telephoto end than at a wide angle end, and a combined focal length of a front lens system between the first lens unit and the aperture stop at the wide angle end, an absolute value of a distance on an optical axis from a first lens surface to the aperture stop at the wide angle end, a focal length of the first lens unit, and a focal length of the zoom lens at the wide angle end is appropriately set.

16 Claims, 13 Drawing Sheets

(56) References Cited

U.S. PATENT DOCUMENTS

| | | | | |
|---|---|---|---|---|
| 2009/0147376 A1* | 6/2009 | Take | ............ | G02B 15/173 359/690 |
| 2009/0290216 A1* | 11/2009 | Fujisaki | ............ | G02B 15/173 359/557 |
| 2011/0310486 A1* | 12/2011 | Eguchi | ............ | G02B 13/18 359/570 |
| 2012/0229921 A1* | 9/2012 | Eguchi | ............ | G02B 15/163 359/771 |
| 2015/0124127 A1* | 5/2015 | Iwashita | ............ | G02B 13/009 348/240.3 |
| 2015/0160442 A1* | 6/2015 | Nanba | ............ | G02B 13/009 359/687 |

FOREIGN PATENT DOCUMENTS

| | | | |
|---|---|---|---|
| JP | 2001108902 | A | 4/2001 |
| JP | 2009251112 | A | 10/2009 |
| JP | 2009251468 | A | 10/2009 |
| JP | 2009301474 | A | 12/2009 |
| JP | 2012042927 | A | 3/2012 |
| JP | 2013218298 | A | 10/2013 |
| WO | 2006095544 | A1 | 9/2006 |
| WO | 2012101958 | A1 | 8/2012 |

* cited by examiner

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an image pickup optical system to be used in an image pickup apparatus using an image pickup element, such as a video camera, a digital still camera, a TV camera, a monitoring camera, an electronic camera, and a film camera.

Description of the Related Art

In recent years, an image pickup apparatus using an image pickup element is increased in functionality, and the entire apparatus is downsized. Moreover, the image pickup element to be used in the image pickup apparatus is increased in sensitivity and size. Accordingly, an image pickup optical system to be used in the image pickup apparatus is required to have high optical performance over the whole range of the image plane, to be small in open f-number, and the like. The image pickup optical system is also required to be as small in aperture diameter of an aperture stop as possible even though a total length of the zoom lens is short and the zoom lens is small in size and f-number.

In U.S. Pat. No. 8,873,155, there is disclosed a five-unit zoom lens including, in order from an object side to an image side, a first lens unit to a fifth lens unit having positive, negative, positive, negative, and positive refractive powers, in which, during zooming, each lens unit is configured to move and an interval between each pair of adjacent lens units is changed.

In U.S. Pat. No. 5,691,851, there is disclosed a six-unit zoom lens including, in order from an object side to an image side, a first lens unit to a sixth lens unit having positive, negative, positive, negative, positive, and negative refractive powers, in which, during zooming, each lens unit is configured to move and an interval between each pair of adjacent lens units is changed.

In U.S. Pat. No. 8,670,187, there is disclosed a three-unit zoom lens including, in order from an object side to an image side, a first lens unit to a third lens unit having positive, negative, and positive refractive powers, in which, during zooming, the second and third lens units are configured to move and an interval between each pair of adjacent lens units is changed.

In order to obtain the zoom lens in which the aperture diameter of the aperture stop is relatively small even though the zoom lens is small in size and f-number, it is important to appropriately set lens structures of a lens system on an object side of the aperture stop and a lens system on an image side of the aperture stop, and the like.

SUMMARY OF THE INVENTION

According to one embodiment of the present invention, there is provided a zoom lens, including, in order from an object side to an image side: a first lens unit having a positive refractive power; a second lens unit having a negative refractive power; and a rear lens group including at least one lens unit. In the zoom lens, an interval between each pair of adjacent lens units is changed during zooming, a refractive power of the rear lens group is positive over an entire zoom range, the rear lens group includes: a partial lens system LRp1 having a positive refractive power closest to the object side; an aperture stop on the image side of the partial lens system LRp1; and at least one partial lens system having a negative refractive power between the aperture stop and an image plane, the first lens unit and the aperture stop are configured to be positioned closer to the object side at a telephoto end than at a wide angle end, and the following conditional expressions are satisfied:

$$0.00 < fssFw/LssFw < 0.75$$

$$3.0 < f1/fw < 20.0$$

where fssFw represents a combined focal length of a front lens system formed of a lens system from the first lens unit to the aperture stop at the wide angle end, LssFw represents an absolute value of a distance on an optical axis from a first lens surface to the aperture stop at the wide angle end, f1 represents a focal length of the first lens unit, and fw represents a focal length of the zoom lens at the wide angle end.

Further features of the present invention will become apparent from the following description of exemplary embodiments with reference to the attached drawings.

DESCRIPTION OF THE EMBODIMENTS

Now, exemplary embodiments of the present invention are described in detail with reference to the accompanying drawings. A zoom lens of the present invention includes, in order from an object side to an image side: a first lens unit having a positive refractive power; a second lens unit having a negative refractive power; and a rear lens group including at least one lens unit. An interval between each pair of adjacent lens units is changed during zooming.

Figure 1:
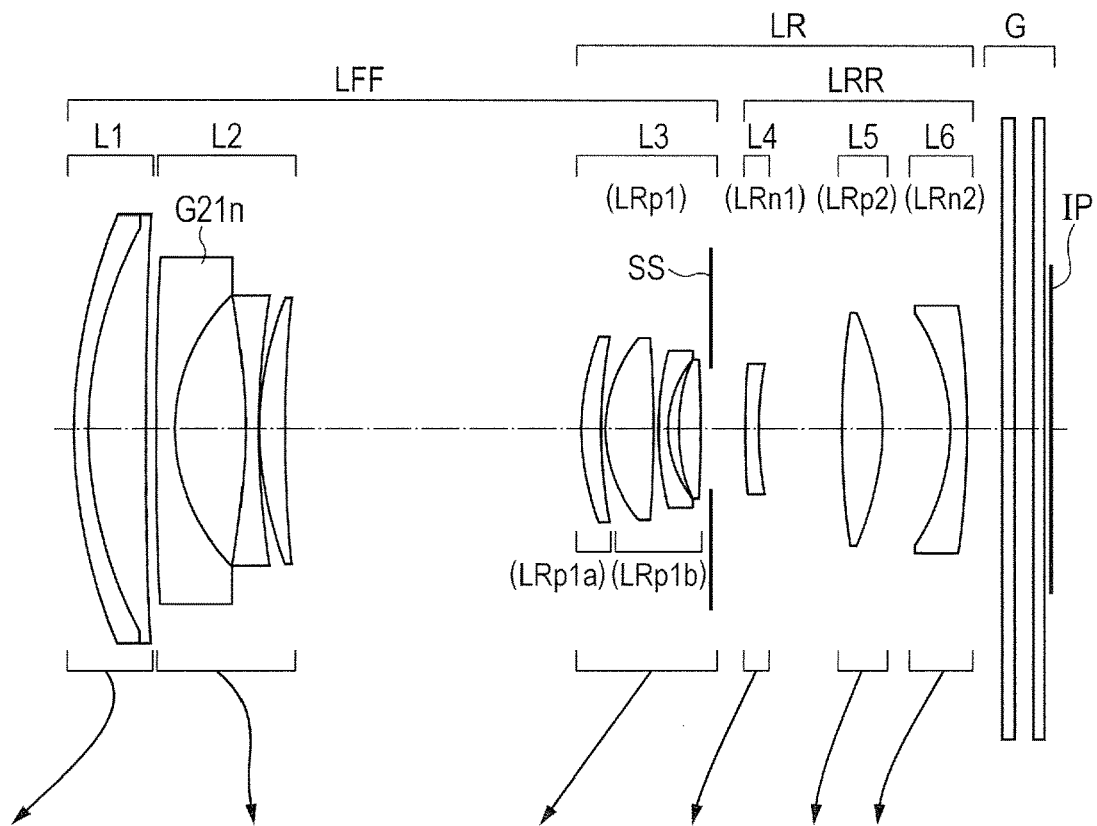
FIG. 1 is a lens cross-sectional view of a zoom lens according to Embodiment 1 of the present invention at a wide angle end.
Figure 2A:
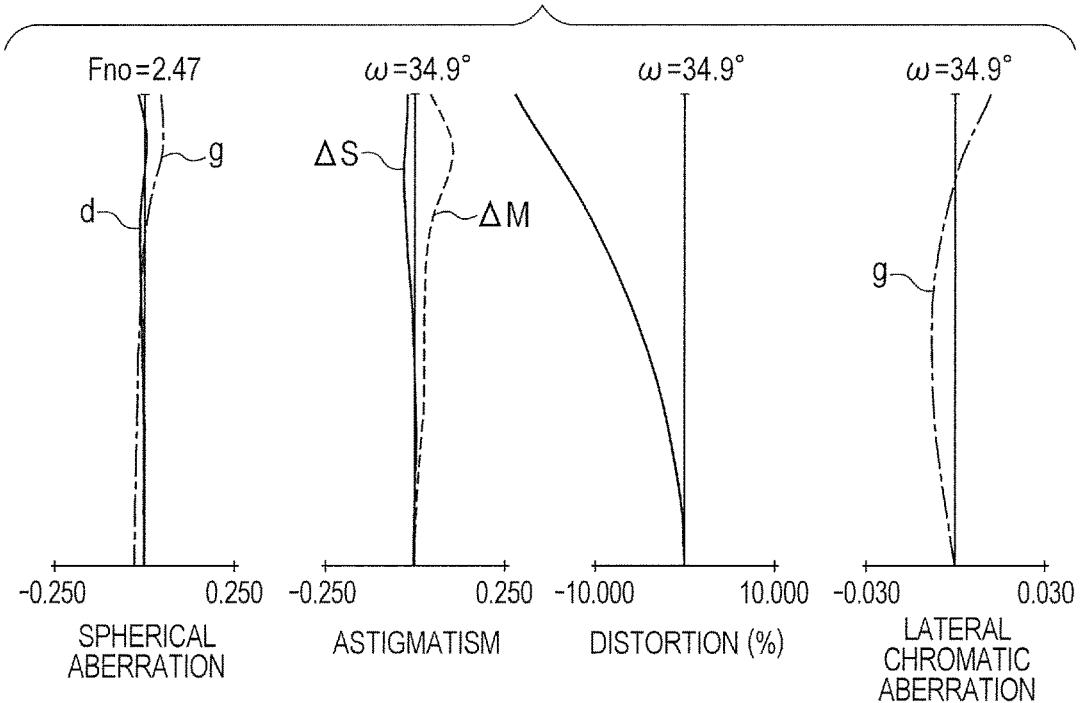
FIG. 2A is a longitudinal aberration diagram of the zoom lens according to Embodiment 1 when focusing at infinity at the wide angle end.
Figure 2B:
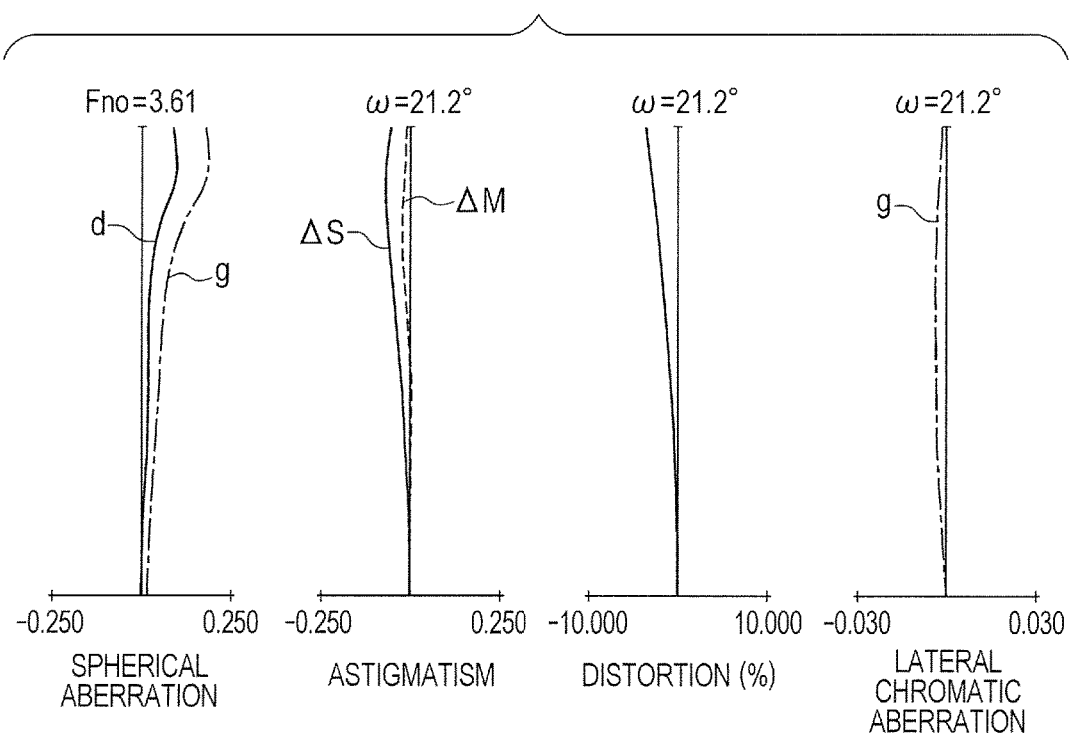
FIG. 2B is a longitudinal aberration diagram of the zoom lens according to Embodiment 1 when focusing at infinity at an intermediate zoom position.
Figure 2C:
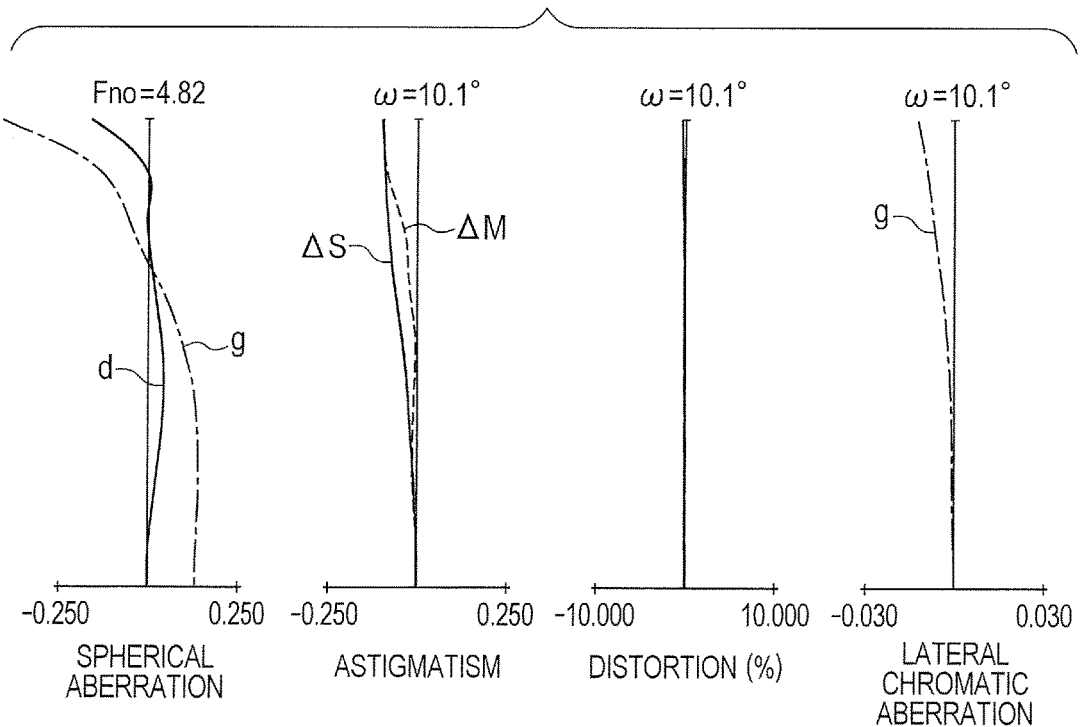
FIG. 2C is a longitudinal aberration diagram of the zoom lens according to Embodiment 1 when focusing at infinity at a telephoto end.

FIG. 1 is a lens cross-sectional view of a zoom lens according to Embodiment 1 of the present invention at a wide angle end (short focal length end). FIG. 2A, FIG. 2B, and FIG. 2C are longitudinal aberration diagrams of the zoom lens according to Embodiment 1 of the present invention when focusing on an object at infinity at the wide angle end, an intermediate zoom position, and a telephoto end (long focal length end), respectively. Embodiment 1 relates to a zoom lens having a zoom ratio of 4.74 and an f-number of from 2.47 to 4.82.

Figure 3:
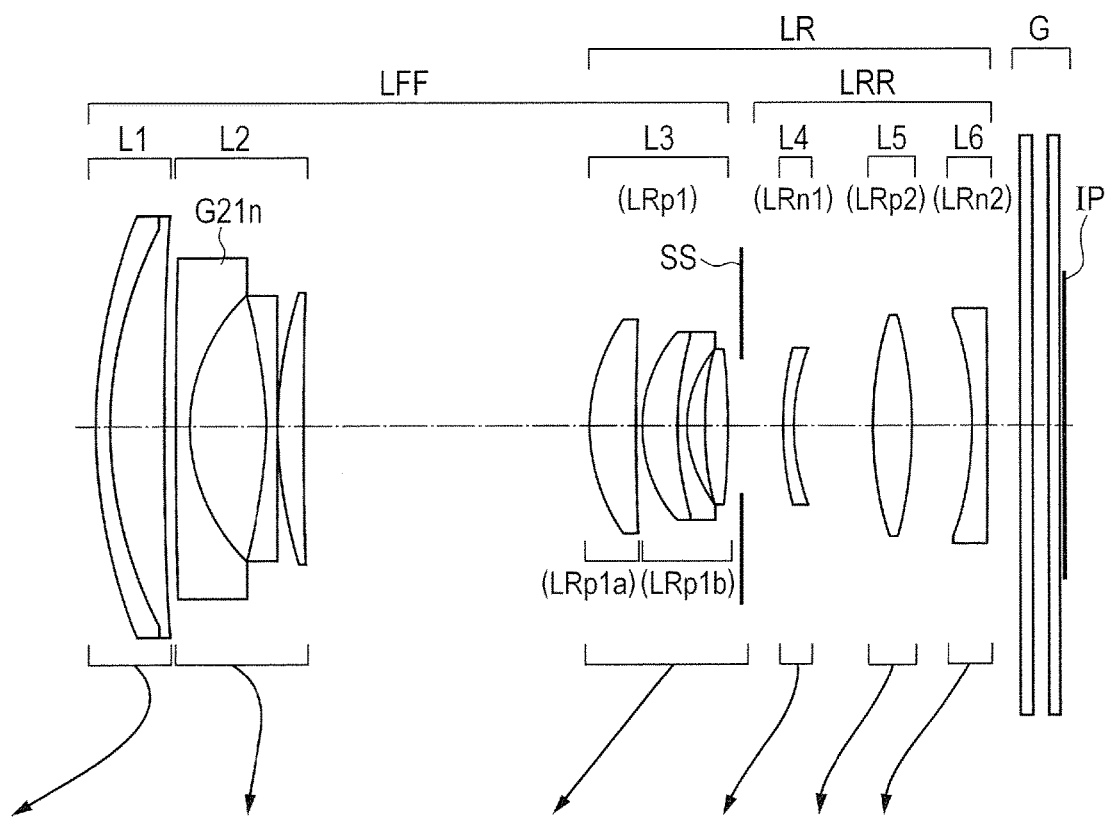
FIG. 3 is a lens cross-sectional view of a zoom lens according to Embodiment 2 of the present invention at a wide angle end.
Figure 4A:
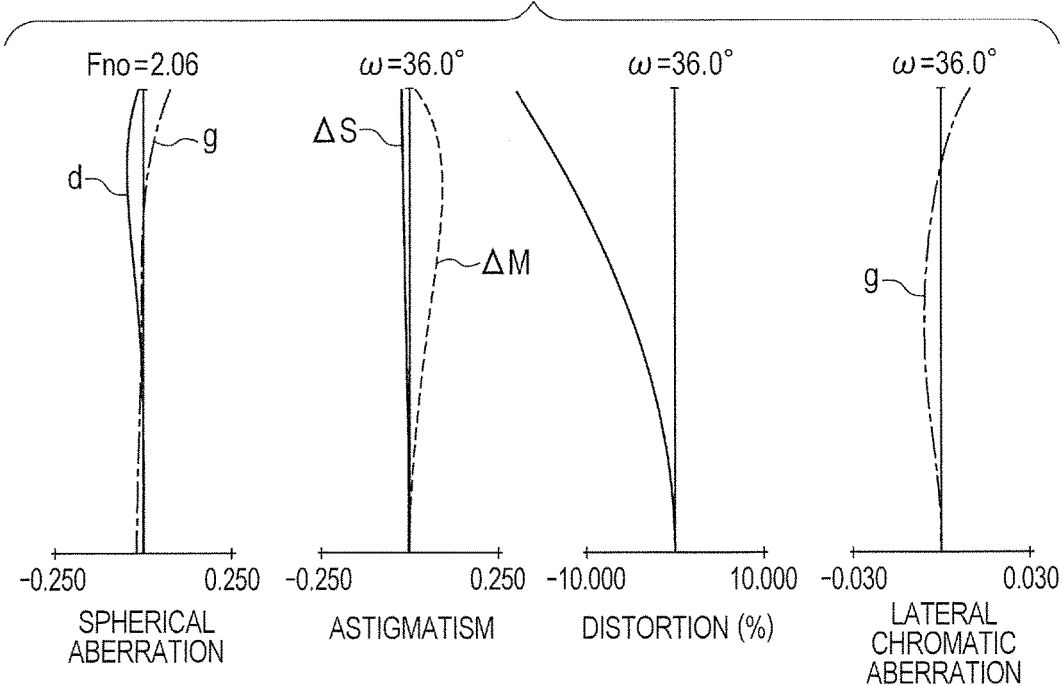
FIG. 4A is a longitudinal aberration diagram of the zoom lens according to Embodiment 2 when focusing at infinity at the wide angle end.
Figure 4B:
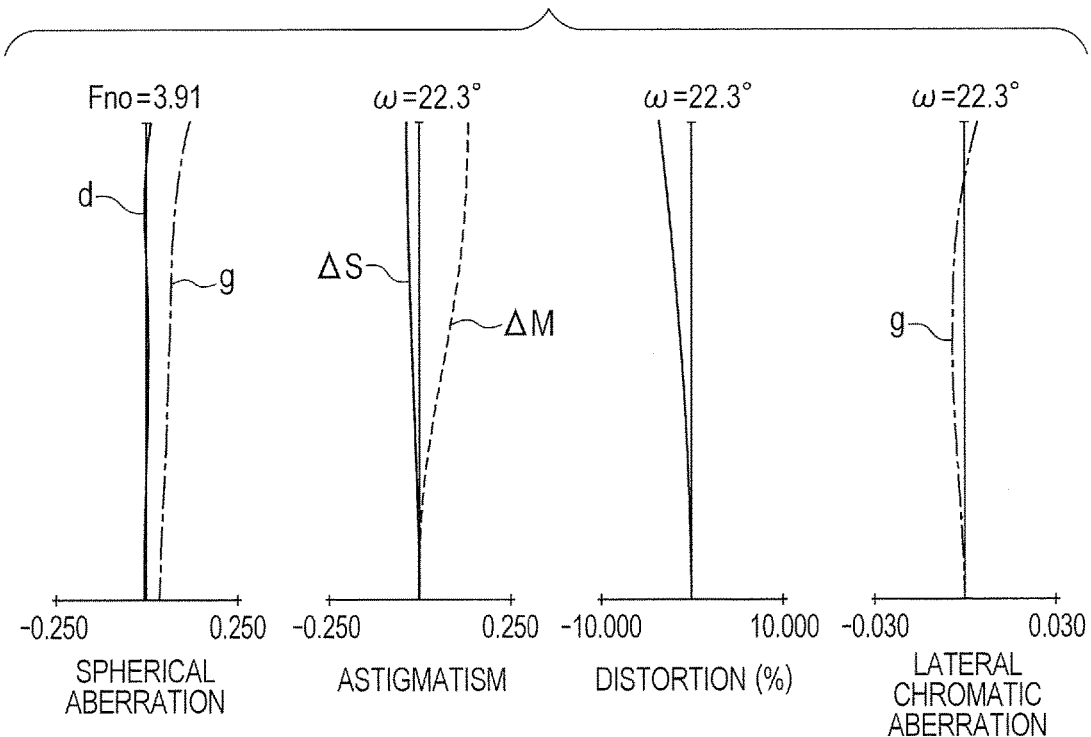
FIG. 4B is a longitudinal aberration diagram of the zoom lens according to Embodiment 2 when focusing at infinity at an intermediate zoom position.
Figure 4C:
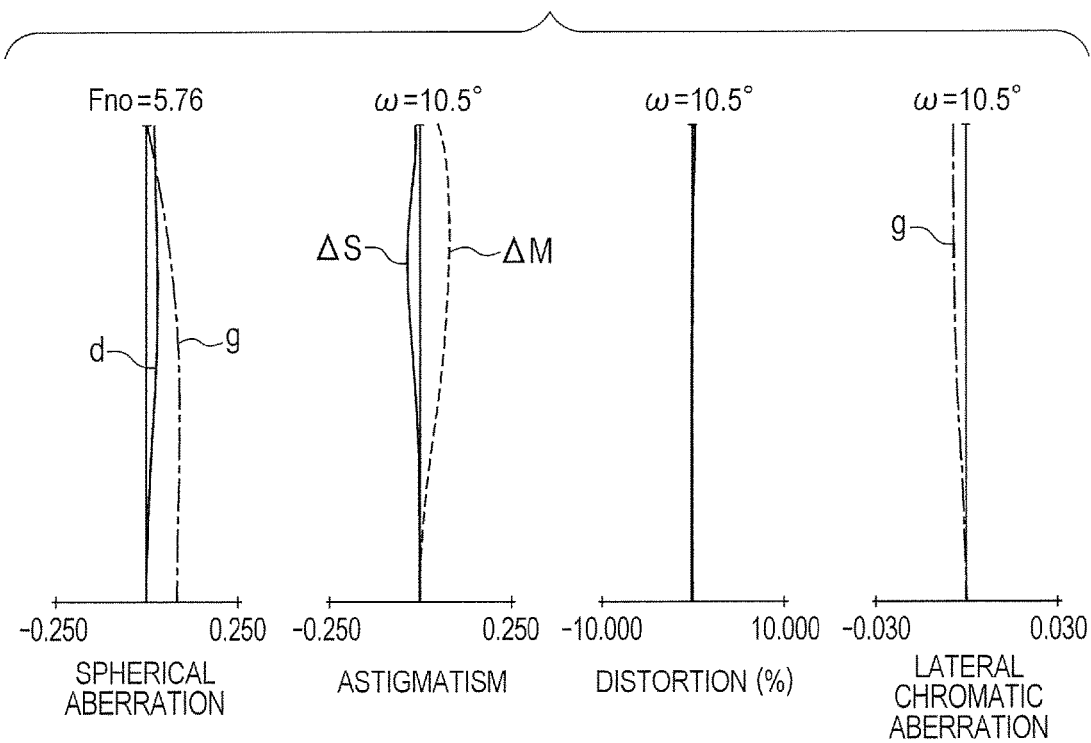
FIG. 4C is a longitudinal aberration diagram of the zoom lens according to Embodiment 2 when focusing at infinity at a telephoto end.

FIG. 3 is a lens cross-sectional view of a zoom lens according to Embodiment 2 of the present invention at a wide angle end. FIG. 4A, FIG. 4B, and FIG. 4C are longitudinal aberration diagrams of the zoom lens according to Embodiment 2 of the present invention when focusing on an object at infinity at the wide angle end, an intermediate zoom position, and a telephoto end, respectively. Embodiment 2 relates to a zoom lens having a zoom ratio of 4.72 and an f-number of from 2.06 to 5.76.

Figure 5:
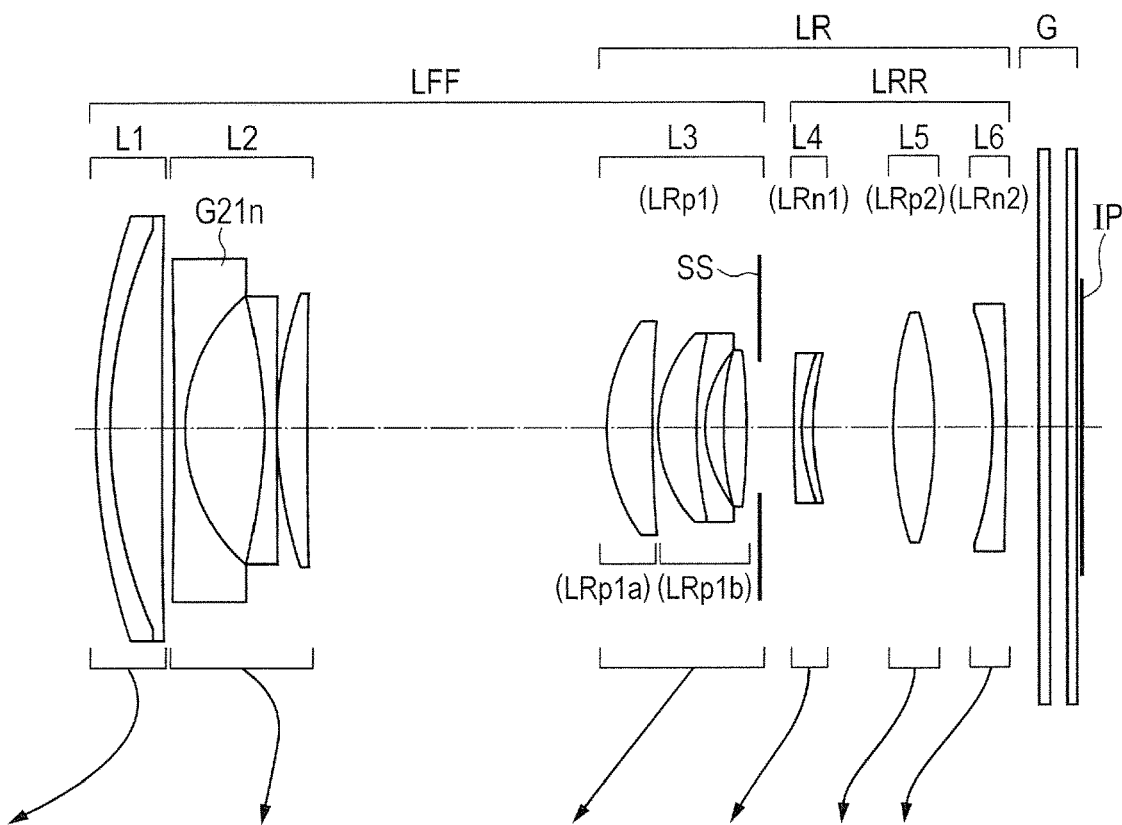
FIG. 5 is a lens cross-sectional view of a zoom lens according to Embodiment 3 of the present invention at a wide angle end.
Figure 6A:
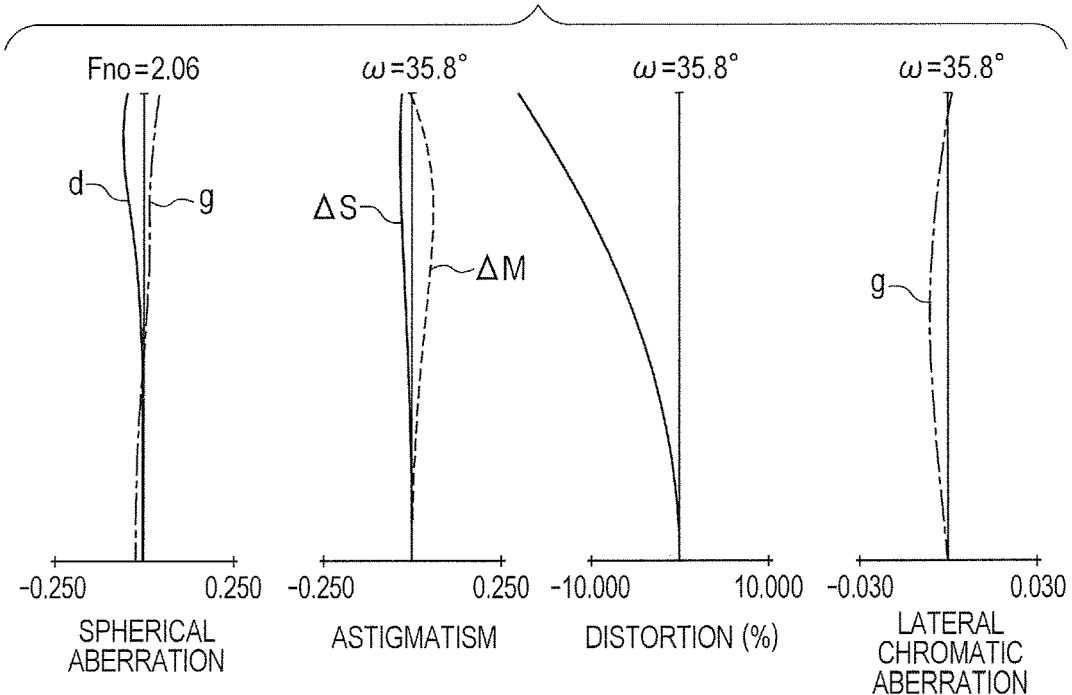
FIG. 6A is a longitudinal aberration diagram of the zoom lens according to Embodiment 3 when focusing at infinity at the wide angle end.
Figure 6B:
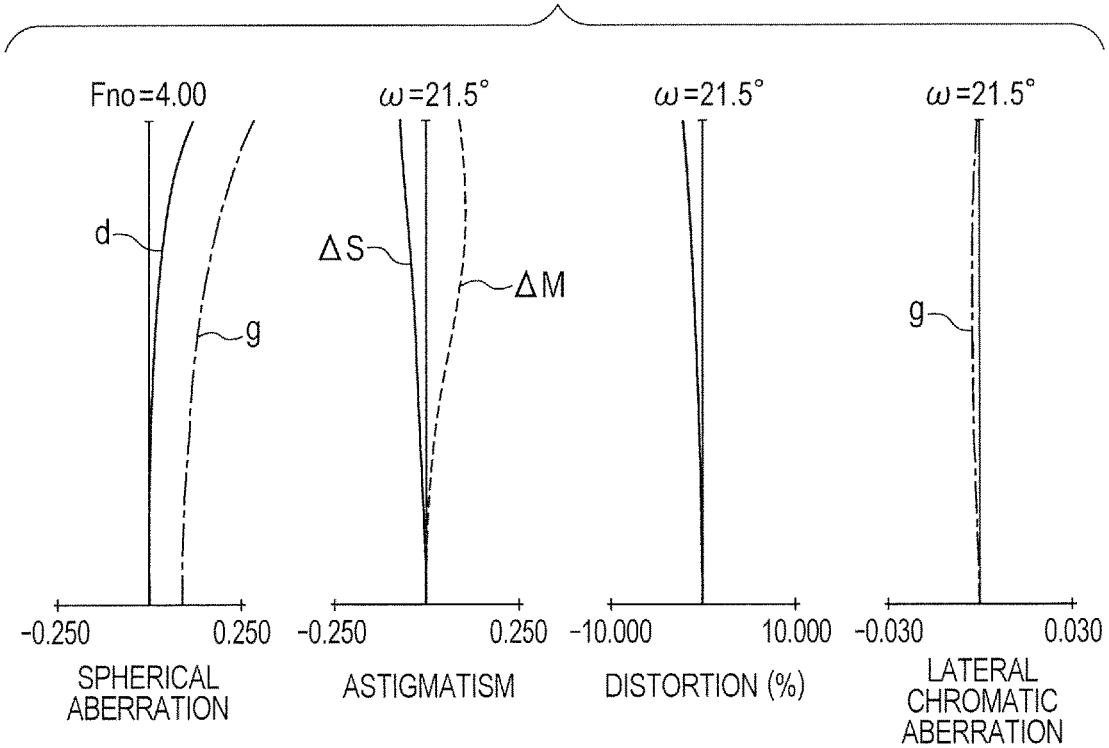
FIG. 6B is a longitudinal aberration diagram of the zoom lens according to Embodiment 3 when focusing at infinity at an intermediate zoom position.
Figure 6C:
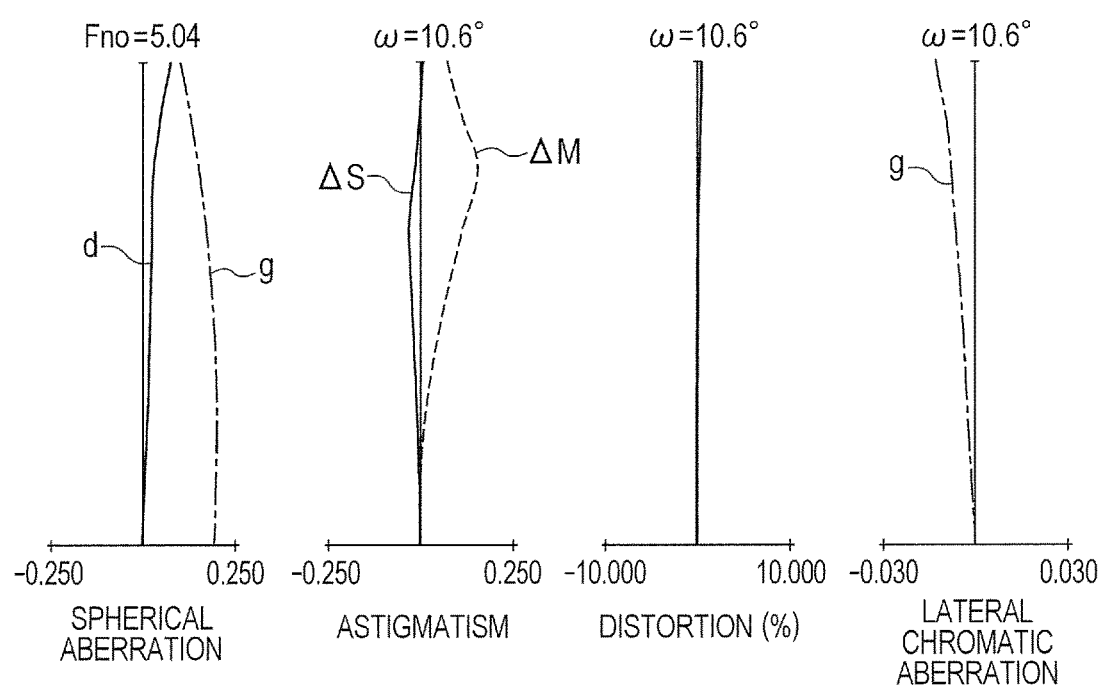
FIG. 6C is a longitudinal aberration diagram of the zoom lens according to Embodiment 3 when focusing at infinity at a telephoto end.

FIG. 5 is a lens cross-sectional view of a zoom lens according to Embodiment 3 of the present invention at a wide angle end. FIG. 6A, FIG. 6B, and FIG. 6C are longitudinal aberration diagrams of the zoom lens according to Embodiment 3 of the present invention when focusing on an object at infinity at the wide angle end, an intermediate zoom position, and a telephoto end, respectively. Embodiment 3 relates to a zoom lens having a zoom ratio of 4.71 and an f-number of from 2.06 to 5.04.

Figure 7:
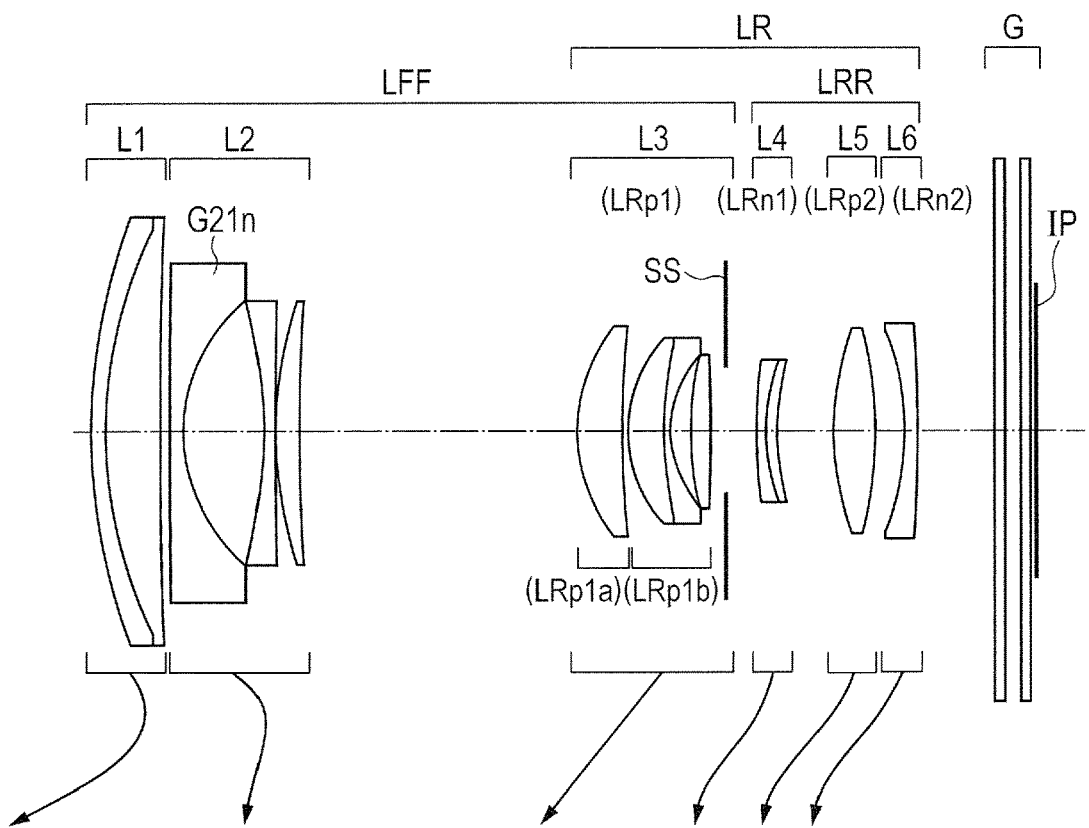
FIG. 7 is a lens cross-sectional view of a zoom lens according to Embodiment 4 of the present invention at a wide angle end.
Figure 8A:
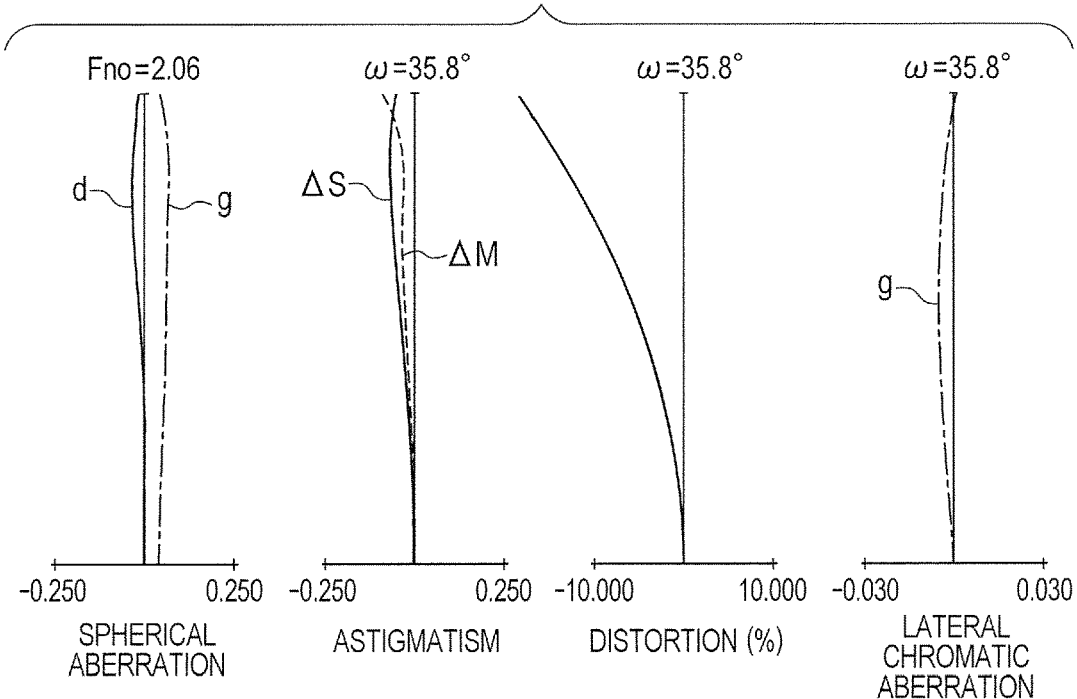
FIG. 8A is a longitudinal aberration diagram of the zoom lens according to Embodiment 4 when focusing at infinity at the wide angle end.
Figure 8B:
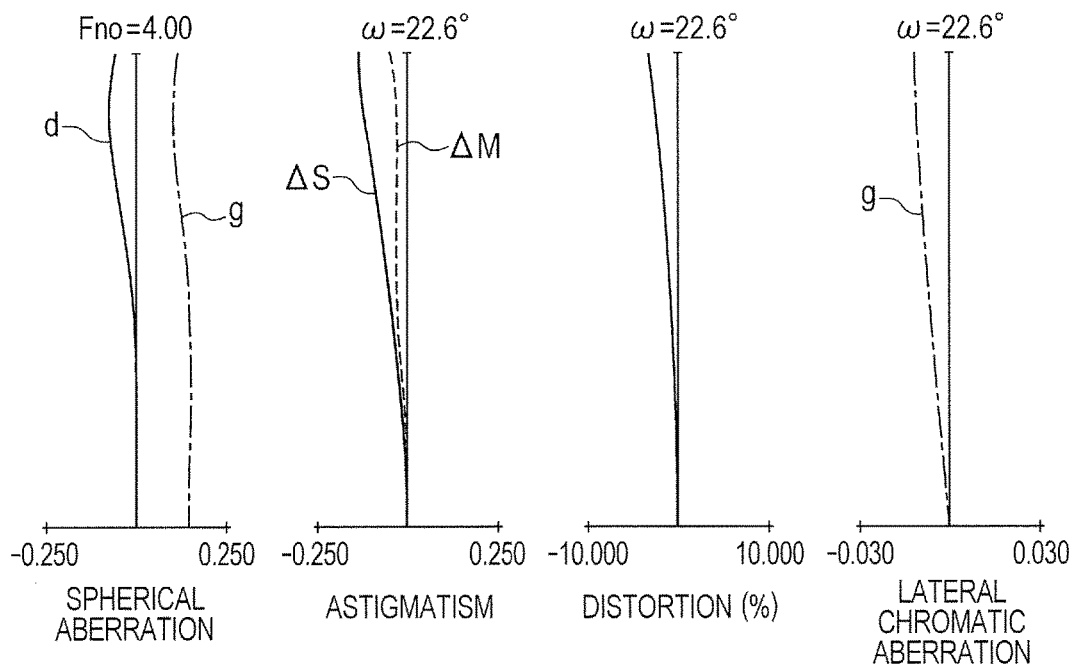
FIG. 8B is a longitudinal aberration diagram of the zoom lens according to Embodiment 4 when focusing at infinity at an intermediate zoom position.
Figure 8C:
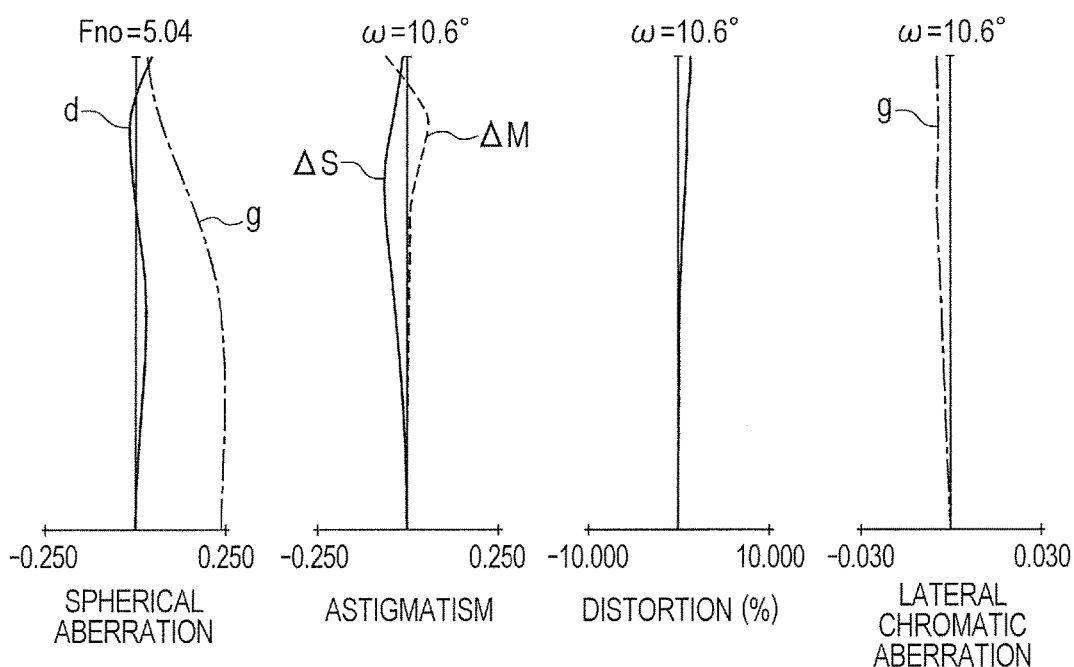
FIG. 8C is a longitudinal aberration diagram of the zoom lens according to Embodiment 4 when focusing at infinity at a telephoto end.

FIG. 7 is a lens cross-sectional view of a zoom lens according to Embodiment 4 of the present invention at a wide angle end. FIG. 8A, FIG. 8B, and FIG. 8C are longitudinal aberration diagrams of the zoom lens according to Embodiment 4 of the present invention when focusing on an object at infinity at the wide angle end, an intermediate zoom position, and a telephoto end, respectively. Embodiment 4 relates to a zoom lens having a zoom ratio of 4.71 and an f-number of from 2.06 to 5.04.

Figure 9:
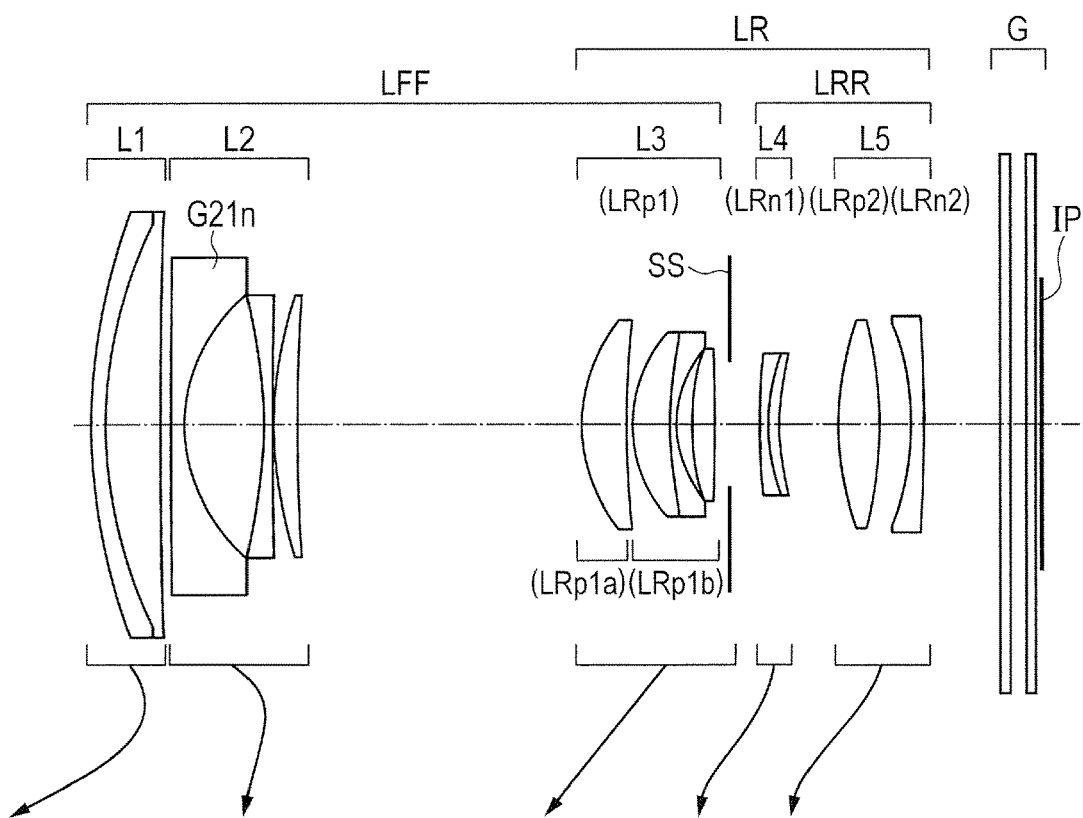
FIG. 9 is a lens cross-sectional view of a zoom lens according to Embodiment 5 of the present invention at a wide angle end.
Figure 10A:
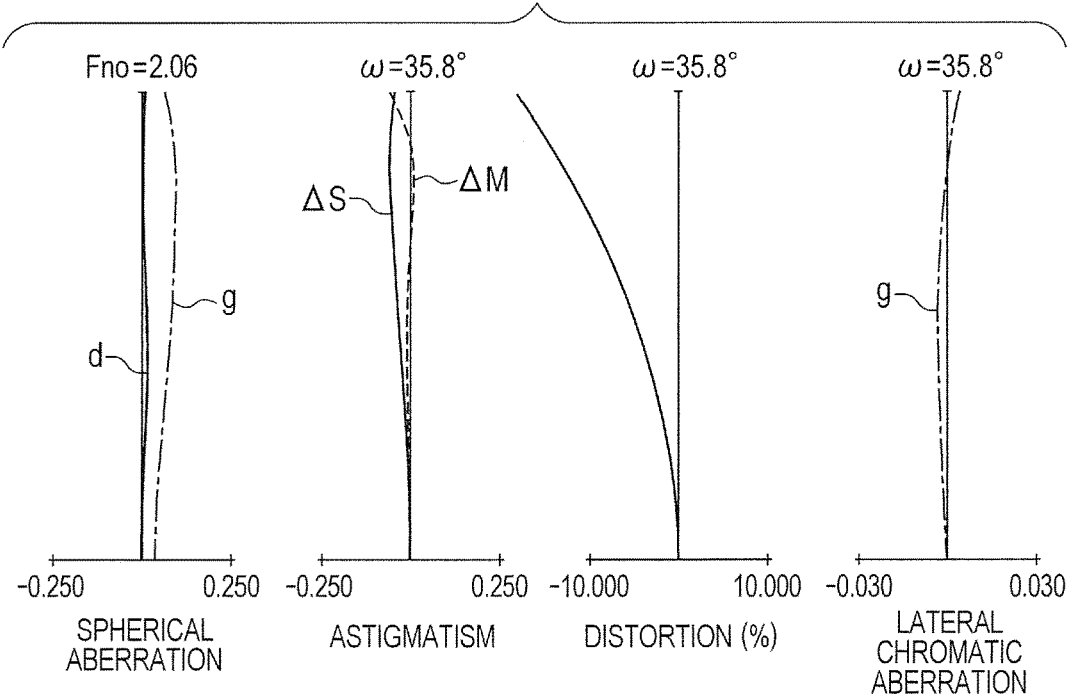
FIG. 10A is a longitudinal aberration diagram of the zoom lens according to Embodiment 5 when focusing at infinity at the wide angle end.
Figure 10B:
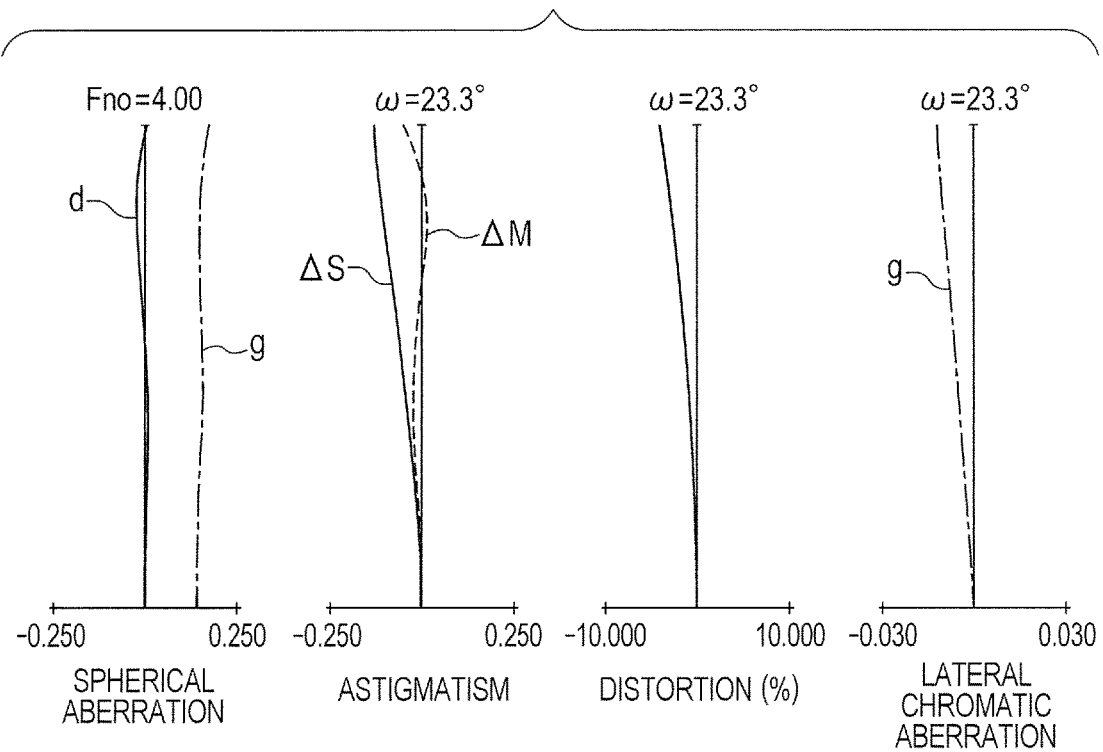
FIG. 10B is a longitudinal aberration diagram of the zoom lens according to Embodiment 5 when focusing at infinity at an intermediate zoom position.
Figure 10C:
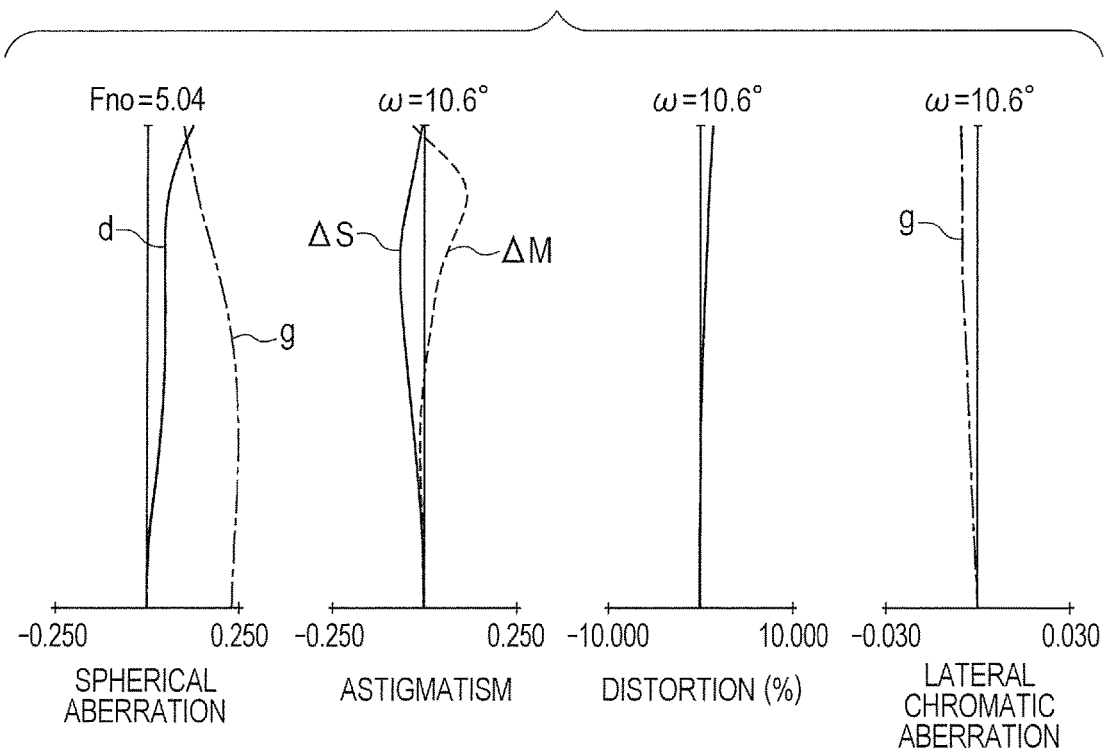
FIG. 10C is a longitudinal aberration diagram of the zoom lens according to Embodiment 5 when focusing at infinity at a telephoto end.

FIG. 9 is a lens cross-sectional view of a zoom lens according to Embodiment 5 of the present invention at a wide angle end. FIG. 10A, FIG. 10B, and FIG. 10C are longitudinal aberration diagrams of the zoom lens according to Embodiment 5 of the present invention when focusing on an object at infinity at the wide angle end, an intermediate zoom position, and a telephoto end, respectively. Embodiment 5 relates to a zoom lens having a zoom ratio of 4.71 and an f-number of from 2.06 to 5.04.

Figure 11:
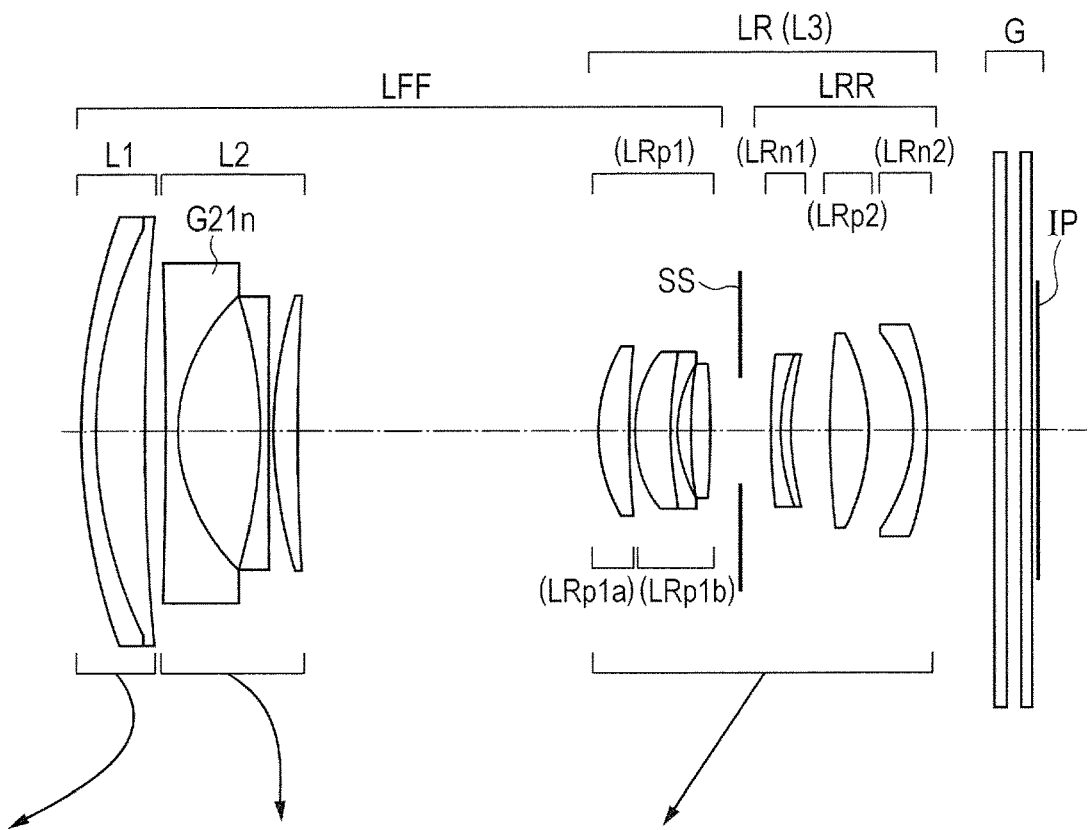
FIG. 11 is a lens cross-sectional view of a zoom lens according to Embodiment 6 of the present invention at a wide angle end.
Figure 12A:
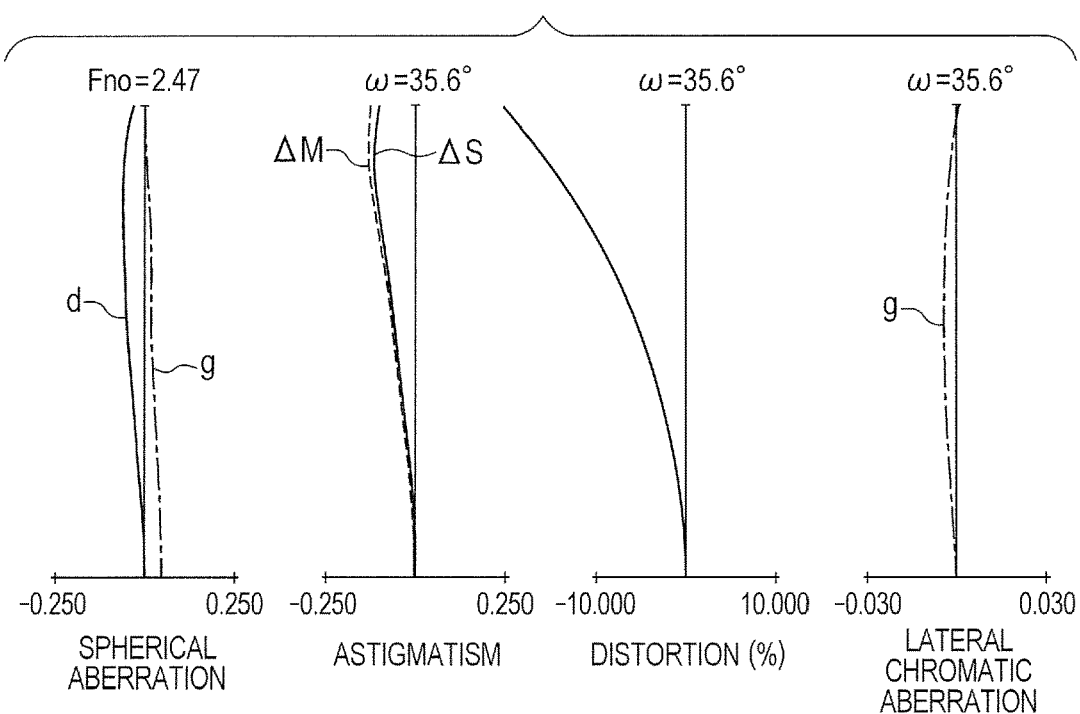
FIG. 12A is a longitudinal aberration diagram of the zoom lens according to Embodiment 6 when focusing at infinity at the wide angle end.
Figure 12B:
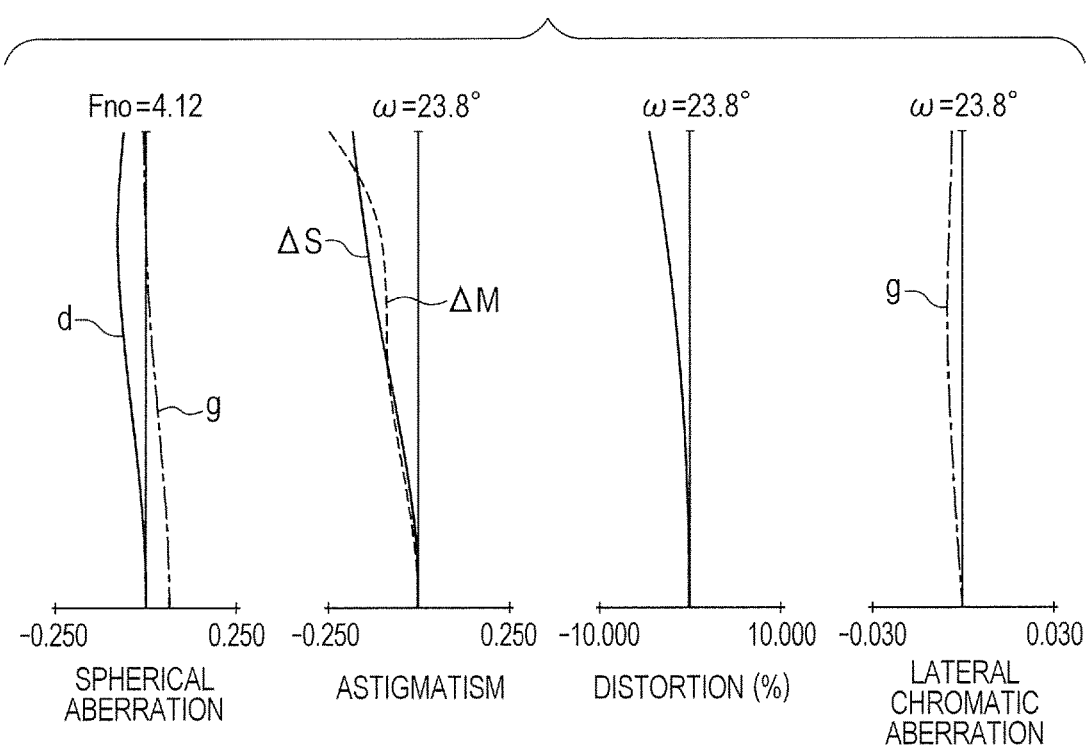
FIG. 12B is a longitudinal aberration diagram of the zoom lens according to Embodiment 6 when focusing at infinity at an intermediate zoom position.
Figure 12C:
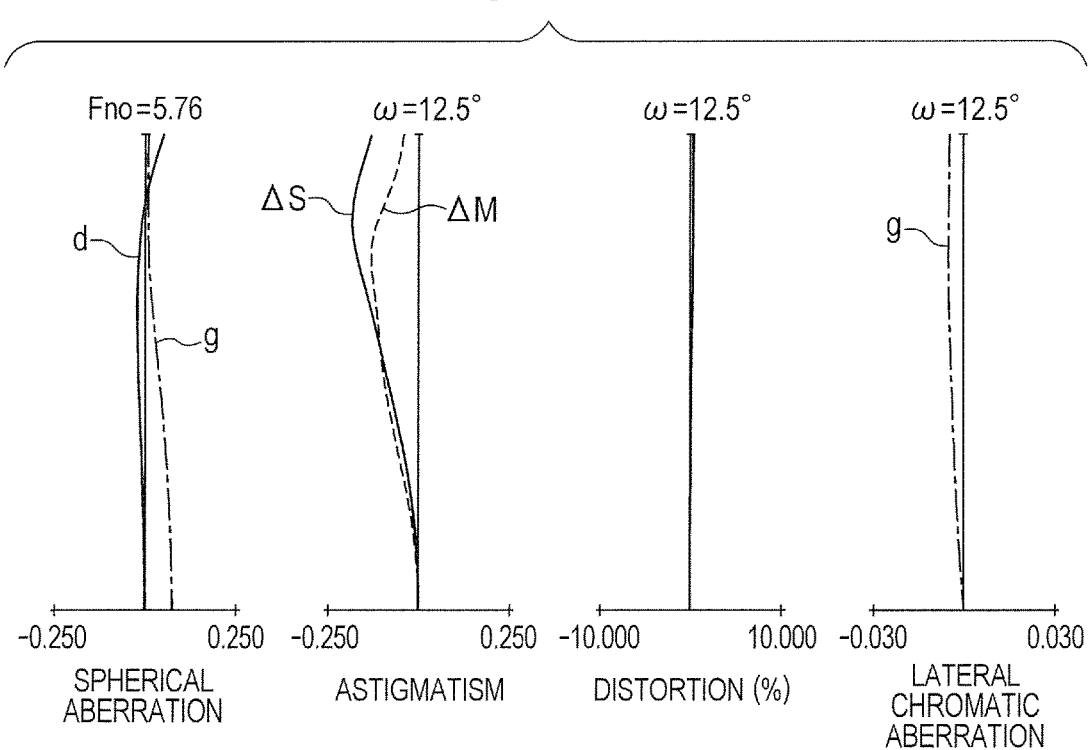
FIG. 12C is a longitudinal aberration diagram of the zoom lens according to Embodiment 6 when focusing at infinity at a telephoto end.

FIG. 11 is a lens cross-sectional view of a zoom lens according to Embodiment 6 of the present invention at a wide angle end. FIG. 12A, FIG. 12B, and FIG. 12C are longitudinal aberration diagrams of the zoom lens according to Embodiment 6 of the present invention when focusing on an object at infinity at the wide angle end, an intermediate zoom position, and a telephoto end, respectively. Embodiment 6 relates to a zoom lens having a zoom ratio of 3.96 and an f-number of from 2.47 to 5.76.

Figure 13:
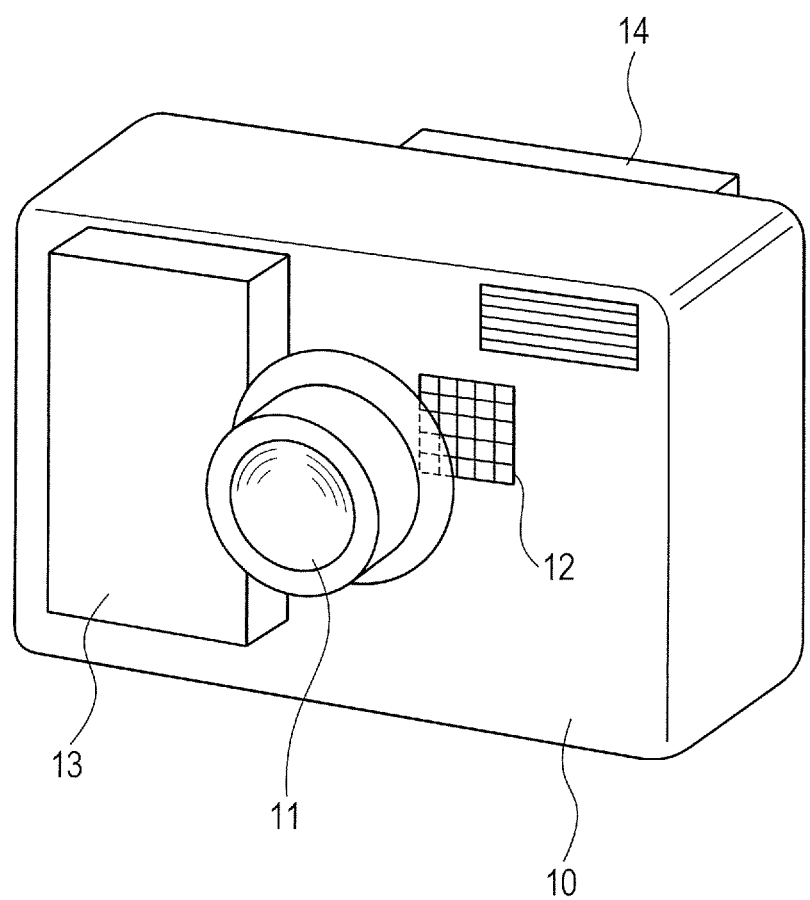
FIG. 13 is a schematic view of a main part of a camera (image pickup apparatus) including the zoom lens according to the present invention.

FIG. 13 is a schematic view of a main part of a camera (image pickup apparatus) including the zoom lens according to the present invention. The zoom lens of each of Embodiments is an image pickup optical system to be used in an image pickup apparatus such as a video camera, a digital camera, a TV camera, a monitoring camera, and a silver-halide film camera. In the lens cross-sectional view, the left side is the object side (front side), and the right side is the image side (rear side). In the lens cross-sectional views, an order of a lens unit counted from the object side is denoted by i, and an i-th lens unit is denoted by Li. A rear lens group LR includes at least one lens unit and has a positive refractive power as a whole over the entire zoom range. An aperture stop is denoted by SS.

An image plane IP corresponds to an image pickup plane of a solid-state image pickup element (photo-electric conversion element) such as a CCD sensor or a CMOS sensor when the zoom lens of the present invention is used as a photographing optical system of a video camera or a digital still camera, and to a film surface when the zoom lens of the present invention is used for a silver-halide film camera. In the lens cross-sectional views, the arrows indicate loci of movements of the lens units during zooming from the wide angle end to the telephoto end.

In the spherical aberration diagrams, a d-line is denoted by d, and a g-line is denoted by g. In the astigmatism diagrams, a meridional image plane is denoted by ΔM, and a sagittal image plane is denoted by ΔS. In the lateral chromatic aberration diagrams, a g-line is denoted by g. A half angle of view (degrees) is represented by ω, and an f-number is represented by Fno. Note that, in each of Embodiments to be described below, the wide angle end and the telephoto end refer to zoom positions when a lens unit for varying the magnification is positioned at both ends of a range in which the lens unit is mechanically movable on an optical axis, respectively.

The zoom lens according to the present invention includes, in order from the object side to the image side, a first lens unit L1 having a positive refractive power, a second lens unit L2 having a negative refractive power, and a rear lens group LR including at least one lens unit. A refractive power of the rear lens group LR is positive over the entire zoom range. Moreover, the rear lens group LR includes, in order from the object side to the image side, a partial lens system LRp1 having a positive refractive power and the aperture stop SS, and also includes at least one partial lens system LRn having a negative refractive power between the aperture stop SS and the image plane IP.

In this embodiment, a lens system having a positive refractive power is mainly arranged on the object side of the aperture stop SS, and a lens system having a negative refractive power is arranged on the image side of the aperture stop SS to adopt a telephoto-type arrangement as the entire optical system. In this manner, a total length of the zoom lens is reduced over the entire zoom range. The term "total length of the zoom lens" as used herein refers to a value obtained by adding a backfocus in air to a distance from the first lens surface to the last lens surface.

Moreover, the first lens unit L1 and the aperture stop SS are configured to be positioned closer to the object side at the telephoto end than at the wide angle end. In this embodiment, the first lens unit L1 is configured to move during zooming to adopt a configuration in which the first lens unit L1 is configured to be positioned closer to the image side at the wide angle end to suppress an increase in effective diameter of a front lens and realize a high zoom ratio while realizing a wide angle of view. Moreover, during zooming from the wide angle end to the telephoto end, the aperture stop SS is configured to move toward the object side to suppress the increase in effective diameter of the front lens at the telephoto end.

The zoom lens of the present invention satisfies the following conditional expressions:

$$0.00 < fssFw/LssFw < 0.75 \quad (1)$$

$$3.0 < f1/fw < 20.0 \quad (2)$$

where fssFw represents a combined focal length of a front lens system LFF formed of a lens system from the first lens unit L1 to the aperture stop SS at the wide angle end, LssFw represents an absolute value of a distance on the optical axis from the first lens surface to the aperture stop SS at the wide angle end, f1 represents a focal length of the first lens unit L1, and fw represents a focal length of the zoom lens at the wide angle end.

Next, technical meanings of the above-mentioned conditional expressions are described. The conditional expression (1) is a conditional expression for suppressing an increase in aperture diameter of the aperture stop SS when a large aperture is realized.

In a case where the zoom lens including a lens barrel is downsized while realizing the large aperture of the zoom lens, suppressing the aperture diameter of the aperture stop SS becomes an important challenge. When an f-number and a focal length of an optical system are determined, a diameter of an entrance pupil is determined. The term "entrance pupil" as used herein is defined as an image of the aperture stop formed by the lens units arranged on the object side of the aperture stop. In other words, in the zoom lens according to the present invention, the entrance pupil is a virtual image of the aperture stop SS formed by the front lens system LFF (having a positive combined focal length) arranged on the object side of the aperture stop SS.

Therefore, in order to control the stop diameter, it is important to appropriately set a refractive power of the front lens system LFF arranged on the object side of the aperture stop SS, and an arrangement of the aperture stop SS. In other words, a positive combined refractive power of the front lens system LFF arranged on the object side of the aperture stop SS is made stronger, and an arrangement in which the distance from the first lens surface to the aperture stop SS is larger is adopted to increase a magnification of the virtual image, with the result that the reduction in aperture diameter of the aperture stop SS is realized.

When the ratio falls below the lower limit of the conditional expression (1), the distance from the first lens surface to the aperture stop SS becomes too long with respect to the focal length of the front lens system LFF arranged on the object side of the aperture stop SS. This results in an arrangement in which the aperture stop SS is positioned excessively on the image side at the wide angle end of the zoom lens, and hence the effective diameter of the front lens is disadvantageously increased. Alternatively, the focal length of the front lens system LFF arranged on the object side of the aperture stop SS becomes too short, and hence it becomes difficult to correct a variation in curvature of field over the entire zoom range, in particular.

On the other hand, when the ratio exceeds the upper limit, the distance from the first lens surface to the aperture stop SS becomes too short with respect to the focal length of the lens units arranged on the object side of the aperture stop SS. At this time, when the large aperture of the zoom lens is realized, the reduction in aperture diameter of the aperture stop SS becomes difficult.

The conditional expression (2) defines a ratio between the focal length of the zoom lens at the wide angle end and the focal length of the first lens unit L1. At this time, a configuration in which the first lens unit L1 is moved toward the object side and in which the conditional expression (2) is satisfied during zooming from the wide angle end to the telephoto end is adopted to reduce the effective diameter of the front lens and the total length of the zoom lens.

When the ratio falls below the lower limit of the conditional expression (2), and hence the focal length of the first lens unit L1 becomes too short with respect to the focal length of the zoom lens at the wide angle end, in a lens structure satisfying the conditional expression (1), a configuration in which an entrance pupil position at the wide angle end is positioned closer to the image side results. Therefore, the effective diameter of the front lens is disadvantageously increased. On the other hand, when the ratio exceeds the upper limit, the focal length of the first lens unit L1 becomes too long with respect to the focal length of the zoom lens at the wide angle end. Therefore, when a desired zoom ratio is to be realized, a movement amount of the first lens unit L1 is increased, the total length of the zoom lens is increased, and the zoom lens is increased in size.

In each of Embodiments, it is more preferred to set the numerical value ranges of the conditional expressions (1) and (2) as follows:

$$0.10 < fssFw/LssFw < 0.55 \quad (1a)$$

$$3.5 < f1/fw < 15.0 \quad (2a).$$

In each of Embodiments, it is further preferred to set the numerical value ranges of the conditional expressions (1a) and (2a) as follows:

$$0.20 < fssFw/LssFw < 0.35 \quad (1b)$$

$$4.0 < f1/fw < 8.0 \quad (2b).$$

With the above-mentioned structure, the reduction in stop diameter of the aperture stop SS is realized while a large aperture ratio is realized, with the result that the zoom lens having good optical performance is realized.

Next, a more preferred structure in the present invention is described. It is preferred that the partial lens system LRp1 having the positive refractive power, which is arranged closest to the object side in the rear lens group LR, include at least two positive lenses and at least one negative lens. With this, in a refractive power arrangement satisfying the conditional expression (1), it becomes easy to optimize the lens structure of the rear lens group LR having a strong positive refractive power, to correct a Petzval sum, and to satisfactorily correct spherical aberration over the entire zoom range.

Moreover, it is preferred that the partial lens system LRp1 have a configuration including, in order from the object side to the image side, a partial lens system LRp1$a$ including one positive lens, and a partial lens system LRp1$b$ including one positive lens and one negative lens. With this configuration, when the large aperture of the zoom lens is realized, it becomes easy to satisfactorily correct the spherical aberration and axial chromatic aberration.

Moreover, it is preferred to arrange a last partial lens system LRn2 having a negative refractive power closest to the image side in the rear lens group LR. The last partial lens system LRn2 has the negative refractive power to form a magnification system and hence obtain an arrangement in which the combined focal length of a lens system on the object side of the last partial lens system LRn2 having the negative refractive power is shorter, with the result that it becomes easy to reduce the total length of the zoom lens. Moreover, it is preferred that the last partial lens system LRn2 be formed of a single lens having a negative refractive power. This reduces thicknesses of the lens units, and hence it becomes easy to reduce a thickness of the lens barrel when the zoom lens is collapsed.

Moreover, it is preferred that the rear lens group LR include, in order from the object side to the image side, a partial lens system LRp1 having a positive refractive power, an aperture stop SS, a partial lens system LRn1 having a negative refractive power, a partial lens system LRp2 having a positive refractive power, and a partial lens system LRn2 having a negative refractive power. With regard to the rear lens group LR, the partial lens system LRp1 having the positive refractive power is arranged on the object side of the aperture stop SS to obtain the lens structure satisfying the conditional expression (1).

Moreover, it is preferred to arrange the partial lens system LRn1 having the negative refractive power, the partial lens system LRp2 having the positive refractive power, and the partial lens system LRn2 (corresponding to the last partial lens system) having the negative refractive power on the image side of the aperture stop SS to share magnification varying. With this, it becomes easy to realize good optical performance over the entire zoom range. Moreover, it is preferred that the aperture stop SS be configured to move integrally with, and hence along the same locus with that of the partial lens system LRp1 during zooming. This simplifies a lens barrel structure, and hence it becomes easy to downsize the zoom lens including the lens barrel structure.

In each of Embodiments 1 to 4, the rear lens group LR includes a third lens unit L3 to a sixth lens unit L6. The first lens unit L1, the second lens unit L2, and the third lens unit L3 form the front lens system LFF. The fourth lens unit L4, the fifth lens unit L5, and the sixth lens unit L6 form a rear lens system LRR. The third lens unit L3 corresponds to the partial lens system LRp1. The fourth lens unit L4 corresponds to the partial lens system LRn (LRn1). The fifth lens unit L5 corresponds to the partial lens system LRp2. The sixth lens unit L6 corresponds to the partial lens system LRn (LRn2). The partial lens system LRp1 includes a partial lens system LRp1$a$ and a partial lens system LRp1$b$.

Moreover, in each of Embodiments 1 to 4, a configuration is adopted in which, during zooming, an interval between the partial lens system LRp1 and the partial lens system LRn1, an interval between the partial lens system LRn1 and the partial lens system LRp2, and an interval between the partial lens system LRp2 and the partial lens system LRn2 are changed. With this, flexibility for positions of the respective partial lens systems are secured, the high zoom ratio is realized, and it becomes easy to satisfactorily correct a variation in curvature of field over the entire zoom range.

The rear lens group LR in Embodiment 5 includes a third lens unit L3 to a fifth lens unit L5. The first lens unit L1, the second lens unit L2, and the third lens unit L3 form the front lens system LFF. The fourth lens unit L4 and the fifth lens unit L5 form the rear lens system LRR. The third lens unit L3 corresponds to the partial lens system LRp1. The fourth lens unit L4 corresponds to the partial lens system LRn (LRn1). The fifth lens unit L5 includes a partial lens system LRp2 and a partial lens system LRn2. The partial lens system LRn2 corresponds to the last partial lens system. The partial lens system LRp1 includes a partial lens system LRp1$a$ and a partial lens system LRp1$b$.

Moreover, in Embodiment 5, a configuration is adopted in which an interval between the partial lens system LRp1 and the partial lens system LRn1, and an interval between the partial lens system LRn1 and the partial lens system LRp2 are changed during zooming. This reduces the number of lens units that are moved independently to simplify the lens barrel structure, and hence it becomes easy to downsize the zoom lens including the lens barrel structure.

In Embodiment 6, the rear lens group LR includes a third lens unit L3. The third lens unit L3 includes a partial lens system LRp1 having a positive refractive power, a partial lens system LRn1 having a negative refractive power, a partial lens system LRp2 having a positive refractive power, and a partial lens system LRn2 having a negative refractive power. The first lens unit L1, the second lens unit L2, and the partial lens system LRp1 form the front lens system LFF. The partial lens system LRn1, the partial lens system LRp2, and the partial lens system LRn2 form the rear lens system LRR. The partial lens system LRn1 corresponds to the partial lens system LRn. The partial lens system LRn2 corresponds to the partial lens system LRn and the last partial lens system. The partial lens system LRp1 includes a partial lens system LRp1$a$ and a partial lens system LRp1$b$.

Moreover, in Embodiment 6, the partial lens system LRp1, the partial lens system LRn1, the partial lens system LRp2, and the partial lens system LRn2 are configured to move along the same locus during zooming. This further reduces the number of lens units that are moved independently, and hence it becomes easy to further simplify the lens barrel structure.

Moreover, in the zoom lens according to the present invention, it is preferred to satisfy at least one of the conditional expressions provided below. A combined lateral magnification of the rear lens system formed of the lens system on the image side of the aperture stop SS at the wide angle end is represented by $\beta ssRw$. A focal length of the second lens unit L2 is represented by f2. A focal length of the partial lens system LRp1 is represented by fRp1. A backfocus in air of the zoom lens at the wide angle end is represented by skw. The second lens unit L2 includes a negative lens G21n closest to the object side, a curvature radius of a lens surface of the negative lens G21n on the object side is represented by R2na, and a curvature radius of a lens surface of the negative lens G21n on the image side is represented by R2nb.

The partial lens system LRp1 includes, in order from the object side to the image side, a partial lens system LRp1a including one positive lens, and a partial lens system LRp1b including one positive lens and one negative lens. A focal length of the partial lens system LRp1a is represented by fRp1a, and a focal length of the partial lens system LRp1b is represented by fRp1b. A focal length of the last partial lens system LRn2 is represented by fRn2. When the partial lens system LRp2 and the partial lens system LRn2 are moved along the same locus during zooming, a combined focal length of the partial lens system LRp2 and the partial lens system LRn2 is represented by fRpn. At this time, it is preferred to satisfy at least one of the following conditional expressions.

$$0.5 < \beta ssRw < 1.5 \quad (3)$$

$$0.8 < |f2|/fw < 2.0 \quad (4)$$

$$0.8 < fRp1/fw < 2.5 \quad (5)$$

$$0.1 < skw/fw < 1.0 \quad (6)$$

$$-1.5 < (R2nb+R2na)/(R2nb-R2na) < -0.5 \quad (7)$$

$$-1.0 < fRp1a/fRp1b < -0.1 \quad (8)$$

$$1.0 < |fRn2|/fw < 5.0 \quad (9)$$

$$1.5 < fRpn/fw < 10.0 \quad (10)$$

Next, technical meanings of the conditional expressions are described. The conditional expression (3) defines the combined lateral magnification of the rear lens system LRR formed of the lens system arranged on the image side of the aperture stop SS when focusing on the object at infinity at the wide angle end. When the combined lateral magnification falls below the lower limit of the conditional expression (3), the combined lateral magnification of the rear lens system LRR arranged on the image side of the aperture stop SS is shifted too much to a reduction direction. At this time, the combined refractive power of the front lens system LFF on the object side of the aperture stop SS becomes too weak at the wide angle end, and hence when the large aperture is to be realized, it becomes difficult to reduce the aperture diameter of the aperture stop SS.

On the other hand, when the combined lateral magnification exceeds the upper limit, the combined lateral magnification of the rear lens system LRR arranged on the image side of the aperture stop SS is shifted too much to an enlargement direction. At this time, the combined refractive power of the front lens system LFF on the object side of the aperture stop SS becomes too strong at the wide angle end, and hence it becomes difficult to correct the curvature of field at the wide angle end.

The conditional expression (4) defines a ratio between a negative focal length of the second lens unit L2 and the focal length of the zoom lens at the wide angle end. When the ratio falls below the lower limit of the conditional expression (4), and hence the negative focal length of the second lens unit L2 becomes too short, that is, an absolute value of the negative refractive power becomes too large, it becomes difficult to correct the variation in curvature of field during zooming from the wide angle end to the telephoto end. On the other hand, when the ratio exceeds the upper limit, and hence the negative focal length of the second lens unit L2 becomes too long, that is, the absolute value of the negative refractive power becomes too small, a movement amount of the second lens unit L2 for obtaining the desired zoom ratio is increased, and the effective diameter of the front lens is disadvantageously increased.

The conditional expression (5) defines a ratio between the focal length of the partial lens system LRp1 arranged closest to the object side in the rear lens group LR and the focal length of the zoom lens at the wide angle end. When the ratio falls below the lower limit of the conditional expression (5), and hence the focal length of the partial lens system LRp1 becomes too short, it becomes difficult to correct the spherical aberration, which increases accompanying the increase in aperture, over the entire zoom range during zooming from the wide angle end to the telephoto end. On the other hand, when the ratio exceeds the upper limit, and hence the focal length of the partial lens system LRp1 becomes too long, a movement amount of the partial lens system LRp1 (lens unit including the partial lens system LRp1) for obtaining the desired zoom ratio is increased, and the aperture diameter of the aperture stop SS is disadvantageously increased.

The conditional expression (6) defines a ratio between a backfocus when focusing on the object at infinity at the wide angle end and the focal length of the zoom lens at the wide angle end. A lens structure satisfies the conditional expression (6) to reduce the total length of the zoom lens and the aperture diameter of the aperture stop SS. In other words, in the lens structure satisfying the conditional expression (1), the front lens system LFF at the wide angle end is configured to have a strong positive refractive power. At this time, the zoom lens adopts a strong telephoto-type refractive power arrangement, and the lens structure satisfies the conditional expression (6) to reduce the backfocus and the total length of the zoom lens.

When the ratio falls below the lower limit of the conditional expression (6), and hence the backfocus becomes too short, the lens units or the partial lens systems interfere with one another at the wide angle end, and it becomes difficult to form the lens barrel structure. On the other hand, when the ratio exceeds the upper limit, and hence the backfocus becomes too long, the total length of the zoom lens is advantageously increased.

The conditional expression (7) is a conditional expression that defines a lens shape of the negative lens G21n arranged closest to the object side in the second lens unit L2. The shape of the negative lens G21n arranged closest to the object side in the second lens unit L2 is optimized to control distortion aberration in the zoom lens.

In this embodiment, a lens structure satisfies the conditional expression (7) to appropriately correct negative distortion aberration at the wide angle end, and hence satisfactorily attain the reduction in effective diameter of the front lens and the correction of the curvature of field.

When the ratio falls below the lower limit of the conditional expression (7), the negative distortion aberration becomes too small at the wide angle end, and the effective diameter of the front lens is disadvantageously increased. On the other hand, when the ratio exceeds the upper limit, the negative distortion aberration becomes too large at the wide angle end, and it becomes difficult to correct the variation in curvature of field when focusing on an object in proximity.

The conditional expression (8) defines refractive power arrangements of the partial lens systems forming the partial lens system LRp1 arranged closest to the object side in the rear lens group LR. Refractive power arrangements of the partial lens system LRp1a formed of one positive lens, which is arranged closest to the object side in the partial lens system LRp1, and the partial lens system LRp1b formed of one positive lens and one negative lens, which is arranged on the image side of the partial lens system LRp1a, are optimized. This adapts to the increase in aperture of the zoom lens, and satisfactorily corrects higher-order spherical aberration and axial chromatic aberration.

When the ratio exceeds the upper limit of the conditional expression (8), and hence an absolute value of the focal length of the partial lens system LRp1b becomes too large with respect to an absolute value of the focal length of the partial lens system LRp1a, the spherical aberration is undercorrected. On the other hand, when the ratio falls below the lower limit, and hence the absolute value of the focal length of the partial lens system LRp1a becomes too large with respect to the absolute value of the focal length of the partial lens system LRp1b, the spherical aberration is overcorrected.

The conditional expression (9) defines a ratio between the focal length of the last partial lens system LRn2 (corresponding to the partial lens system LRn) arranged closest to the image side in the rear lens group LR and the focal length of the zoom lens at the wide angle end. The last partial lens system LRn2 has the negative refractive power, and the rear lens group LR serves as the magnification system to strengthen refractive powers of the lens systems arranged on the object side of the last partial lens system LRn2, and reduce the total length of the zoom lens. When the ratio falls below the lower limit of the conditional expression (9), and hence an absolute value of the focal length of the last partial lens system LRn2 becomes too small, the refractive powers of the partial lens systems on the object side become too strong, with the result that it becomes difficult to correct various aberrations over the entire zoom range, and an angle of incidence of a light beam on the image plane disadvantageously becomes too large.

On the other hand, when the ratio exceeds the upper limit, and hence the absolute value of the focal length of the last partial lens system LRn2 becomes too large, the refractive powers of the partial lens systems on the object side become too weak, with the result that the total length of the zoom lens is increased, and the zoom lens is increased in size.

The conditional expression (10) defines a ratio between the combined focal length of a combined system of the partial lens system LRp2 and the partial lens system LRn2, which form the rear lens group LR, and the focal length of the zoom lens at the wide angle end. When the ratio falls below the lower limit of the conditional expression (10), the combined focal length of the combined system of the partial lens system LRp2 and the partial lens system LRn2 becomes short, and the positive refractive power becomes too strong, the lateral magnification of the combined system becomes small. This results in an arrangement in which the combined focal length of the partial lens systems arranged on the object side of the partial lens system LRp2 is long, the total length of the zoom lens is increased, and the zoom lens is disadvantageously increased in size.

On the other hand, when the ratio exceeds the upper limit, and hence the focal length of the combined system becomes too long, the negative refractive power of the partial lens system LRn2 becomes strong, that is, the absolute value of the negative refractive power becomes large, and this results in an arrangement in which an exit pupil position is brought too close to the image plane. Then, an angle of incidence of a light beam on an image pickup element becomes too large, and it becomes difficult to correct shading characteristics of the image pickup element, which is undesirable. In each of Embodiments, it is more preferred to set the numerical value ranges of the conditional expressions (3) to (10) as follows.

$$0.65 < \beta ssRw < 1.40 \tag{3a}$$

$$0.90 < |f2|/fw < 1.75 \tag{4a}$$

$$0.9 < fRp1/fw < 2.0 \tag{5a}$$

$$0.2 < skw/fw < 0.8 \tag{6a}$$

$$-1.4 < (R2nb+R2na)/(R2nb-R2na) < -0.7 \tag{7a}$$

$$-0.85 < fRp1a/fRp1b < -0.13 \tag{8a}$$

$$1.3 < |fRn2|/fw < 4.0 \tag{9a}$$

$$2.0 < fRpn/fw < 8.0 \tag{10a}$$

It is more preferred to set the numerical value ranges of the conditional expressions (3a) to (10a) as follows.

$$0.80 < \beta ssRw < 1.30 \tag{3b}$$

$$1.0 < |f2|/fw < 1.5 \tag{4b}$$

$$1.0 < fRp1/fw < 1.6 \tag{5b}$$

$$0.3 < skw/fw < 0.5 \tag{6b}$$

$$-1.2 < (R2nb+R2na)/(R2nb-R2na) < -0.8 \tag{7b}$$

$$-0.70 < fRp1a/fRp1b < -0.15 \tag{8b}$$

$$1.5 < |fRn2|/fw < 3.5 \tag{9b}$$

$$2.5 < fRpn/fw < 5.0 \tag{10b}$$

Next, a lens structure in each of Embodiments is described.

Embodiment 1

Now referring to FIG. 1, the zoom lens according to Embodiment 1 of the present invention is described. Embodiment 1 in FIG. 1 relates to a zoom lens of a six-unit structure including, in order from an object side to an image side, a first lens unit L1 to a sixth lens unit L6 having positive, negative, positive, negative, positive, and negative refractive powers. In this embodiment, the third lens unit L3, the fourth lens unit L4, the fifth lens unit L5, and the sixth lens unit L6 form a partial lens system forming the rear lens group LR. Moreover, for focusing on an object at close distance, a rear focus system in which the fifth lens unit L5 is configured to move toward the object side is adopted.

In Embodiment 1, during zooming from the wide angle end to the telephoto end, the first lens unit L1 is configured to move along a locus that is convex toward the image side. Moreover, the second lens unit L2 is configured to move along a non-linear locus toward the image side to compensate for the image plane accompanying the magnification varying. Moreover, the third lens unit L3, the fourth lens unit L4, the fifth lens unit L5, and the sixth lens unit L6 are configured to move toward the object side while changing an interval between each pair of the lens units to vary the magnification.

The first lens unit L1 includes, in order from the object side to the image side, a cemented lens formed by cementing a negative lens having a meniscus shape with a convex surface on the object side and a positive lens. The second lens unit L2 includes, in order from the object side to the image side, a negative lens having a concave surface on the image side, a negative lens having a biconcave shape, and a positive lens having a meniscus shape with a convex surface on the object side. The third lens unit L3 includes, in order from the object side to the image side, a positive lens having a meniscus shape with a convex surface on the object side, in which both lens surfaces have aspherical shapes, a positive lens having a biconvex shape, a negative lens having a meniscus shape with a convex surface on the object side, and a positive lens having a biconvex shape, in which a surface on the image side has an aspherical shape.

The fourth lens unit L4 includes a negative lens having a meniscus shape with a convex surface on the object side, in which both lens surfaces have aspherical shapes. The fifth lens unit L5 includes a positive lens having a biconvex shape. The sixth lens unit L6 includes a negative lens having a meniscus shape with a convex surface on the image side, in which a surface on the image side has an aspherical shape. The numbers of constituent lenses of the fourth lens unit L4 to the sixth lens unit L6 are reduced to reduce the thickness when collapsed.

Embodiment 2

Now referring to FIG. 3, the zoom lens according to Embodiment 2 of the present invention is described. A zoom type and a focus system in Embodiment 2 are the same as those of Embodiment 1 in FIG. 1. As compared to Embodiment 1, Embodiment 2 is different in that the wide angle of view and the large aperture are realized, and in that lens shapes of the lenses in each of the lens units are changed. The second lens unit L2 includes, in order from the object side to the image side, a negative lens having a concave surface on the image side, a negative lens having a concave surface on the object side, and a positive lens having a meniscus shape with a convex surface on the object side.

The third lens unit L3 includes, in order from the object side to the image side, a positive lens having a meniscus shape with a convex surface on the object side, in which both lens surfaces have aspherical shapes, a cemented lens formed by cementing a positive lens having a meniscus shape with a convex surface on the object side and a negative lens, and a positive lens having a biconvex shape, in which a surface on the image side has an aspherical shape. A cemented lens surface is arranged in the third lens unit L3 to satisfactorily correct the higher-order spherical aberration, which becomes difficult to correct accompanying the increase in aperture, and reduce eccentric sensitivity of the zoom lens. The numbers of lenses and lens shapes of the fourth lens unit L4 and the fifth lens unit L5 are the same as those in Embodiment 1. The sixth lens unit L6 includes a negative lens having a concave shape on the object side, in which a surface on the image side has an aspherical shape.

Embodiment 3

Now referring to FIG. 5, the zoom lens according to Embodiment 3 of the present invention is described. A zoom type and a focus system in Embodiment 3 in FIG. 5 are the same as those of Embodiment 1 in FIG. 1. As compared to Embodiment 1, Embodiment 3 is different in that lens shapes of the lenses in each of the lens units are changed. The numbers of lenses and lens shapes of the first lens unit L1, the second lens unit L2, and the third lens unit L3 are the same as those in Embodiment 2.

The fourth lens unit L4 includes, in order from the object side to the image side, a cemented lens formed by cementing a negative lens having a meniscus shape with a convex surface on the object side, in which the surface on the object side has an aspherical shape, and a positive lens having a meniscus shape with a convex surface on the object side. The fourth lens unit L4 is configured to be achromatic to obtain a lens structure suitable as an image stabilizing lens unit for correcting camera shake, in particular. The numbers of lenses and lens shapes of the fifth lens unit L5 and the sixth lens unit L6 are the same as those in Embodiment 2.

Embodiment 4

Now referring to FIG. 7, a zoom lens according to Embodiment 4 of the present invention is described. Embodiment 4 is the same as Embodiment 1 in FIG. 1 in terms of the zoom type. The numbers of lenses and lens shapes of the first lens unit L1 to the sixth lens unit L6 are the same as those in Embodiment 3. As compared to Embodiment 3, Embodiment 4 is different in that the large aperture is realized at the telephoto end, and that curvatures of lens surfaces in each lens unit are changed. Moreover, for focusing on the object at close distance, a rear focus system in which the sixth lens unit L6 is configured to move toward an image plane side is adopted.

Embodiment 5

Now referring to FIG. 9, a zoom lens according to Embodiment 5 of the present invention is described. Embodiment 5 relates to a zoom lens having a five-unit structure including, in order from the object side to the image side, a first lens unit L1 to a fifth lens unit L5 having positive, negative, positive, negative, and positive refractive powers. In this embodiment, the third lens unit L3, the fourth lens unit L4, and the fifth lens unit L5 form a partial lens system of the rear lens group LR. The fifth lens unit L5 includes a partial lens system LRp2 having a positive refractive power, and a partial lens system LRn2 having a negative refractive power. Moreover, for focusing on the object at close distance, a rear focus system in which the partial lens system LRn2 having the negative refractive power, which forms the fifth lens unit L5, is configured to move toward an image plane side is adopted.

In Embodiment 5, during zooming from the wide angle end to the telephoto end, the first lens unit L1 is configured to move along a locus that is convex toward the image side. Moreover, the second lens unit L2 is configured to move along a non-linear locus toward the image side to compensate for the image plane, which is configured to move accompanying the magnification varying. Moreover, the third lens unit L3, the fourth lens unit L4, and the fifth lens unit L5 are configured to move toward the object side while changing an interval between each pair of the lens units to vary the magnification. The numbers of lenses and lens shapes of the first lens unit L1, the second lens unit L2, and the third lens unit L3 are the same as those in Embodiment 2. The number of lenses and lens shapes of the fourth lens unit L4 are the same as those in Embodiment 3. The fifth lens unit L5 includes a positive lens having a biconvex shape, and a negative lens having a meniscus shape with a convex surface on the image side, in which the surface on the image side has an aspherical shape.

Embodiment 6

Now referring to FIG. 11, a zoom lens according to Embodiment 6 of the present invention is described.

Embodiment 6 relates to a zoom lens having a three-unit structure including, in order from the object side to the image side, a first lens unit L1 to a third lens unit L3 having positive, negative, and positive refractive powers. The rear lens group LR is formed of the third lens unit L3, and the third lens unit L3 includes a partial lens system LRp1 having a positive refractive power, a partial lens system LRn1 having a negative refractive power, a partial lens system LRp2 having a positive refractive power, and a partial lens system LRn2 having a negative refractive power.

For focusing on the object at close distance, a rear focus system in which the partial lens system LRn2 having the negative refractive power, which form the third lens unit L3, is configured to move toward the image plane side is adopted. In Embodiment 6, during zooming from the wide angle end to the telephoto end, the first lens unit L1 is configured to move along a locus that is convex toward the image side. Moreover, the second lens unit L2 is configured to move along a non-linear locus toward the image side to compensate for the image plane, which is configured to move accompanying the magnification varying. The third lens unit L3 is configured to move toward the object side to vary the magnification.

The number of lenses and lens shapes of the first lens unit L1 are the same as those in Embodiment 1. The second lens unit L2 includes, in order from the object side to the image side, a negative lens having a concave surface on the image side, a negative lens having a concave surface on the object side, and a positive lens having a meniscus shape with a convex surface on the object side.

The third lens unit L3 includes, in order from the object side to the image side, a positive lens having a meniscus shape with a convex surface on the object side, in which both lens surfaces have aspherical shapes, and a cemented lens formed by cementing a positive lens having a meniscus shape with a convex surface on the object side and a negative lens having a meniscus shape with a convex surface on the object side. The third lens unit L3 further includes a positive lens having a biconvex shape, in which the surface on the image side has an aspherical shape, an aperture stop SS, and a cemented lens formed by cementing a negative lens having a meniscus shape with a convex surface on the object side, in which the surface on the object side has an aspherical shape, and a positive lens having a meniscus shape with a convex surface on the object side. The third lens unit L3 further includes a positive lens having a biconvex shape, and a negative lens having a meniscus shape with a convex surface on the image side, in which the surface on the image side has an aspherical shape.

Exemplary embodiments of the present invention have been described above. However, the present invention is not limited to those embodiments, and various alterations and modifications may be made without departing from the spirit of the present invention. For example, partial lens systems forming the whole or a part of each lens unit may be configured to be eccentric so as to have a component in a direction perpendicular to an optical axis for the purpose of correcting image blur. In this case, it is preferred that a part of the partial lens systems forming the rear lens group LR, in particular, the partial lens system LRp1 or the partial lens system LRn1 be used to perform the image blur correction. Moreover, the distortion aberration remaining in the zoom lens may be corrected by image processing.

Next, an image pickup apparatus in which the zoom lens of the present invention is used as an image pickup optical system is described. FIG. 13 is an illustration of an image pickup apparatus 10 that includes a photographing optical system 11 including the zoom lens of the present invention, and a solid-state image pickup element (photo-electric conversion element) 12 such as a CCD sensor or a CMOS sensor configured to receive light of a subject image formed by the photographing optical system 11. In addition, the image pickup apparatus 10 includes a recording unit 13, which records the subject image received by the image pickup element 12, and a viewfinder 14 for observing the subject image displayed on a display element (not shown). The display element is formed of a liquid crystal panel or the like, and displays the subject image formed on the image pickup element 12.

In this manner, the zoom lens of the present invention may be applied to an optical instrument such as a digital camera to realize an optical instrument having the high optical characteristic. Note that, the present invention may equally be applied to a single lens reflex (SLR) camera without a quick return mirror. Note that, the zoom lens of the present invention may equally be applied to a video camera.

Although the exemplary embodiments of the present invention have been described so far, the present invention is by no means limited to those embodiments, and hence various changes and modifications can be made within the scope of the subject matter of the present invention.

Now, specific numerical data of Numerical Embodiments 1 to 6 are described, which correspond to Embodiments 1 to 6, respectively. In each of Numerical Embodiments, symbol i represents the number of a surface counted from the object side. Symbol ri represents a curvature radius of an i-th optical surface (i-th surface). Symbol di represents a gap between an i-th surface and an (i+1)th surface on the optical axis. Symbols ndi and vdi represent a refractive index and an Abbe number of a material of an optical member between the i-th surface and the (i+1)th surface with respect to the d-line, respectively. Here, an Abbe number vd of a material is expressed by the following equation.

$$\nu d = (Nd-1)/(NF-NC)$$

Nd: a refractive index with respect to the Fraunhofer d-line (wavelength: 587.6 nm)
NF: a refractive index with respect to the Fraunhofer F-line (wavelength: 486.1 nm)
NC: a refractive index with respect to the Fraunhofer C-line (wavelength: 656.3 nm)

When a direction of travel of light is defined as positive, a shift amount from a surface vertex in an optical axis direction is represented by x, a height from the optical axis in the direction perpendicular to the optical axis is represented by h, a paraxial radius of curvature is represented by r, a conic constant is represented by K, and aspherical coefficients are represented by A4, A6, A8, and A10, an aspherical shape is expressed by the following equation:

$$x = (h^2/r)/[1+\{1-(1+K)\times(h/r)^2\}^{1/2}] + A4 \times h^4 + A6 \times h^6 + A8 \times h^8 + A10 \times h^{10}.$$

Note that, the numerical value "E±XX" means "×10$^{±XX}$". Moreover, relationships between the above-mentioned conditional expressions and Numerical Embodiments are shown in (Table 1).

| Numerical Emodiment 1 Unit mm | | | | | |
|---|---|---|---|---|---|
| Surface data | | | | | |
| Surface number | r | d | nd | vd | Effective diameter |

Numerical Embodiment 1
Unit mm

| | | | | | |
|---|---|---|---|---|---|
| 1 | 46.290 | 1.20 | 1.95906 | 17.5 | 34.00 |
| 2 | 35.151 | 4.66 | 1.77250 | 49.6 | 31.85 |
| 3 | 357.660 | (Variable) | | | 30.43 |
| 4* | 356.906 | 1.50 | 1.85135 | 40.1 | 27.20 |
| 5* | 16.592 | 5.80 | | | 21.14 |
| 6 | −37.125 | 1.00 | 1.69680 | 55.5 | 20.98 |
| 7 | 67.818 | 0.10 | | | 20.66 |
| 8 | 29.865 | 2.05 | 1.95906 | 17.5 | 20.72 |
| 9 | 101.594 | (Variable) | | | 20.48 |
| 10* | 18.963 | 1.76 | 1.85135 | 40.1 | 14.30 |
| 11* | 48.957 | 0.30 | | | 14.09 |
| 12 | 11.636 | 4.03 | 1.49700 | 81.5 | 13.94 |
| 13 | −76.754 | 0.30 | | | 13.21 |
| 14 | 23.795 | 0.80 | 2.00100 | 29.1 | 11.96 |
| 15 | 9.332 | 0.88 | | | 10.72 |
| 16* | 16.103 | 1.80 | 1.55332 | 71.7 | 10.71 |
| 17* | −163.434 | 0.80 | | | 10.46 |
| 18 (Stop) | ∞ | (Variable) | | | 10.00 |
| 19* | 931.557 | 1.00 | 1.85135 | 40.1 | 9.45 |
| 20* | 26.253 | (Variable) | | | 9.78 |
| 21 | 65.068 | 3.33 | 1.74400 | 44.8 | 17.60 |
| 22 | −22.740 | (Variable) | | | 17.88 |
| 23 | −17.214 | 1.30 | 1.69350 | 53.2 | 17.75 |
| 24* | −182.046 | (Variable) | | | 19.14 |
| 25 | ∞ | 1.03 | 1.51633 | 64.1 | 50.00 |
| 26 | ∞ | 1.49 | | | 50.00 |
| 27 | ∞ | 0.92 | 1.51633 | 64.1 | 50.00 |
| 28 | ∞ | 0.50 | | | 50.00 |
| Image plane | ∞ | | | | |

Aspherical surface data

Fourth surface

K = 0.00000e+000  A4 = −2.40692e−006  A6 = 3.60609e−008
A8 = −1.97094e−010  A10 = 3.38368e−013

Fifth surface

K = 0.00000e+000  A4 = 7.32208e−006  A6 = 6.49797e−008
A8 = 2.33582e−010  A10 = 6.41870e−013

Tenth surface

K = 0.00000e+000  A4 = −3.79789e−006  A6 = −9.11913e−008
A8 = −3.88973e−010

Eleventh surface

K = 0.00000e+000  A4 = 3.76884e−005

Seventeenth surface

K = 0.00000e+000  A4 = 4.20034e−006  A6 = −2.07222e−007
A8 = 1.60552e−008

Nineteenth surface

K = 0.00000e+000  A4 = 6.13111e−005  A6 = −3.40689e−006
A8 = 4.89211e−008  A10 = −4.30254e−010

Twentieth surface

K = 0.00000e+000  A4 = 9.93069e−005  A6 = −3.63784e−006
A8 = 3.19900e−008

Twenty-fourth surface

K = 0.00000e+000  A4 = −4.78063e−005  A6 = 1.11021e−007
A8 = −6.81571e−010  A10 = 2.57709e−012

Various data
Zoom ratio 4.72

| | Wide angle | Intermediate | Telephoto |
|---|---|---|---|
| Focal length | 16.27 | 35.14 | 76.80 |
| F-number | 2.47 | 3.61 | 4.82 |
| Half angle of view (degree) | 34.88 | 21.24 | 10.09 |
| Image height | 11.34 | 13.66 | 13.66 |
| Total lens length | 80.00 | 82.60 | 95.00 |
| BF (in air) | 6.28 | 12.78 | 16.54 |
| d3 | 0.93 | 8.87 | 21.93 |
| d9 | 24.25 | 10.03 | 0.50 |
| d18 | 3.00 | 6.39 | 10.92 |
| d20 | 6.68 | 7.61 | 9.22 |
| d22 | 5.60 | 3.66 | 2.63 |
| d24 | 3.00 | 9.50 | 13.26 |
| Entrance pupil position | 24.72 | 37.85 | 72.21 |
| Exit pupil position | −20.56 | −30.20 | −39.06 |
| Front principal point position | 28.42 | 32.76 | −0.09 |
| Rear principal point position | −15.77 | −34.64 | −76.30 |

Zoom lens unit data

| Unit | First surface | Focal length | Lens structure length | Front principal point position | Rear principal point position |
|---|---|---|---|---|---|
| L1 | 1 | 74.44 | 5.86 | −0.76 | −3.97 |
| L2 | 4 | −17.64 | 10.45 | 1.48 | −6.68 |
| L3 | 10 | 18.16 | 10.66 | −0.50 | −7.84 |
| L4 | 19 | −31.75 | 1.00 | 0.56 | 0.02 |
| L5 | 21 | 23.02 | 3.33 | 1.44 | −0.50 |
| L6 | 23 | −27.50 | 1.30 | −0.08 | −0.85 |
| G | 25 | ∞ | 3.45 | 1.39 | −1.39 |

Single lens data

| Lens | First surface | Focal length |
|---|---|---|
| 1 | 1 | −160.80 |
| 2 | 2 | 50.15 |
| 3 | 4 | −20.48 |
| 4 | 6 | −34.30 |
| 5 | 8 | 43.50 |
| 6 | 10 | 35.40 |
| 7 | 12 | 20.64 |
| 8 | 14 | −15.77 |
| 9 | 16 | 26.59 |
| 10 | 19 | −31.75 |
| 11 | 21 | 23.02 |
| 12 | 23 | −27.50 |
| 13 | 25 | 0.00 |
| 14 | 27 | 0.00 |

Numerical Embodiment 2
Unit mm

Surface data

| Surface number | r | d | nd | vd | Effective diameter |
|---|---|---|---|---|---|
| 1 | 52.839 | 1.20 | 1.92286 | 18.9 | 36.02 |
| 2 | 39.749 | 4.80 | 1.77250 | 49.6 | 34.89 |
| 3 | 415.774 | (variable) | | | 34.32 |
| 4 | 822.108 | 1.00 | 1.88300 | 40.8 | 28.81 |
| 5 | 16.474 | 6.88 | | | 22.81 |
| 6 | −32.493 | 1.00 | 1.72916 | 54.7 | 22.68 |
| 7 | −1,585.087 | 0.10 | | | 22.79 |
| 8 | 40.988 | 2.17 | 1.95906 | 17.5 | 22.89 |
| 9 | 306.429 | (Variable) | | | 22.70 |
| 10* | 16.121 | 4.11 | 1.74330 | 49.3 | 17.94 |
| 11* | 1,217.960 | 0.50 | | | 17.35 |
| 12 | 12.713 | 3.23 | 1.48749 | 70.2 | 15.62 |
| 13 | 32.004 | 0.80 | 2.00069 | 25.5 | 14.44 |
| 14 | 10.809 | 1.58 | | | 12.86 |
| 15 | 38.590 | 2.02 | 1.55332 | 71.7 | 12.86 |
| 16* | −58.250 | 1.20 | | | 12.63 |

Numerical Embodiment 2
Unit mm

| | | | | | |
|---|---|---|---|---|---|
| 17 (Stop) | ∞ | (Variable) | | | 12.00 |
| 18* | 25.626 | 1.00 | 1.55332 | 71.7 | 12.55 |
| 19* | 17.714 | (Variable) | | | 12.77 |
| 20 | 34.207 | 3.50 | 1.64000 | 60.1 | 18.17 |
| 21 | −38.692 | (Variable) | | | 18.43 |
| 22 | −28.104 | 1.30 | 1.67790 | 54.9 | 18.66 |
| 23* | 392.879 | (Variable) | | | 19.55 |
| 24 | ∞ | 1.03 | 1.51633 | 64.1 | 50.00 |
| 25 | ∞ | 1.49 | | | 50.00 |
| 26 | ∞ | 0.92 | 1.51633 | 64.1 | 50.00 |
| 27 | ∞ | 0.50 | | | 50.00 |
| Image plane | ∞ | | | | |

Aspherical surface data

Tenth surface

K = 0.00000e+000   A4 = −1.164096e−005   A6 = −4.59303e−009
A8 = 9.36502e−011

Eleventh surface

K = 0.00000e+000   A4 = 1.87368e−005   A6 = 5.02314e−009

Sixteenth surface

K = 0.00000e+000   A4 = 8.11203e−006   A6 = −6.32736e−008
A8 = 4.90155e−009

Eighteenth surface

K = 0.00000e+000   A4 = −2.32442e−005   A6 = −3.20654e−007
A8 = 1.90857e−009   A10 = −9.17022e−012

Nineteenth surface

K = 0.00000e+000   A4 = −1.89163e−005   A6 = 5.87708e−007
A8 = 2.49921e−009

Twenty-third surface

K = 0.00000e+000   A4 = −1.83551e−005   A6 = 5.19807e−008
A8 = −1.29964e−010   A10 = 6.20299e−013

Various data
Zoom ratio 4.72

| | Wide angle | Intermediate | Telephoto |
|---|---|---|---|
| Focal length | 15.60 | 33.30 | 73.60 |
| F-number | 2.06 | 3.91 | 5.76 |
| Half angle of view (degree) | 36.01 | 22.30 | 10.51 |
| Image height | 11.34 | 13.66 | 13.66 |
| Total lens length | 85.91 | 88.09 | 110.00 |
| BF (in air) | 6.28 | 16.31 | 22.07 |
| d3 | 1.08 | 8.07 | 27.45 |
| d9 | 25.54 | 9.28 | 0.35 |
| d17 | 3.64 | 9.58 | 12.84 |
| d19 | 6.99 | 4.08 | 6.48 |
| d21 | 5.32 | 3.72 | 3.75 |
| d23 | 3.00 | 13.02 | 18.79 |
| Entrance pupil position | 24.59 | 35.01 | 88.86 |
| Exit pupil position | −22.44 | −34.28 | −46.09 |
| Front principal point position | 29.58 | 36.43 | 46.20 |
| Rear principal point position | −15.10 | −32.80 | −73.10 |

Zoom lens unit data

| Unit | First surface | Focal length | Lens structure length | Front principal point position | Rear principal point position |
|---|---|---|---|---|---|
| L1 | 1 | 83.65 | 6.00 | −0.72 | −4.02 |
| L2 | 4 | −18.58 | 11.15 | 0.52 | −8.76 |
| L3 | 10 | 23.24 | 13.44 | −2.41 | −11.27 |
| L4 | 18 | −108.58 | 1.00 | 2.18 | 1.51 |
| L5 | 20 | 28.91 | 3.50 | 1.02 | −1.16 |
| L6 | 22 | −38.64 | 1.30 | 0.05 | −0.72 |
| G | 24 | ∞ | 3.45 | 1.39 | −1.39 |

Single lens data

| Lens | First surface | Focal length |
|---|---|---|
| 1 | 1 | −181.87 |
| 2 | 2 | 56.58 |
| 3 | 4 | −19.05 |
| 4 | 6 | −45.51 |
| 5 | 8 | 49.14 |
| 6 | 10 | 21.95 |
| 7 | 12 | 41.02 |
| 8 | 13 | −16.62 |
| 9 | 15 | 42.27 |
| 10 | 18 | −108.58 |
| 11 | 20 | 28.91 |
| 12 | 22 | −38.64 |
| 13 | 24 | 0.00 |
| 14 | 26 | 0.00 |

Numerical Embodiment 3
Unit mm

Surface data

| Surface number | r | d | nd | vd | Effective diameter |
|---|---|---|---|---|---|
| 1 | 61.484 | 1.20 | 1.92286 | 18.9 | 37.95 |
| 2 | 45.367 | 4.70 | 1.77250 | 49.6 | 36.88 |
| 3 | 574.850 | (Variable) | | | 36.38 |
| 4 | −1,902.899 | 1.00 | 1.83481 | 42.7 | 30.00 |
| 5 | 16.708 | 7.17 | | | 23.63 |
| 6 | −35.279 | 1.00 | 1.72916 | 54.7 | 23.52 |
| 7 | 455.193 | 0.30 | | | 23.68 |
| 8 | 40.206 | 2.53 | 1.92286 | 18.9 | 23.94 |
| 9 | 445.086 | (Variable) | | | 23.74 |
| 10* | 16.787 | 4.24 | 1.74330 | 49.3 | 18.52 |
| 11* | 281.262 | 0.50 | | | 17.83 |
| 12 | 13.020 | 3.54 | 1.48749 | 70.2 | 16.20 |
| 13 | 33.472 | 0.80 | 1.84666 | 23.8 | 14.88 |
| 14 | 10.658 | 1.69 | | | 13.16 |
| 15 | 36.720 | 2.17 | 1.55332 | 71.7 | 13.16 |
| 16* | −44.038 | 1.20 | | | 12.87 |
| 17 (Stop) | ∞ | (Variable) | | | 12.03 |
| 18* | 83.092 | 0.80 | 1.85135 | 40.1 | 11.96 |
| 19 | 18.854 | 1.02 | 1.80809 | 22.8 | 12.33 |
| 20 | 28.055 | (Variable) | | | 12.52 |
| 21 | 37.666 | 3.73 | 1.69680 | 55.5 | 19.90 |
| 22 | −41.799 | (Variable) | | | 20.23 |
| 23 | −38.919 | 1.30 | 1.85135 | 40.1 | 20.71 |
| 24* | −734.572 | (Variable) | | | 21.54 |
| 25 | ∞ | 1.03 | 1.51633 | 64.1 | 50.00 |
| 26 | ∞ | 1.49 | | | 50.00 |
| 27 | ∞ | 0.92 | 1.51633 | 64.1 | 50.00 |
| 28 | ∞ | 0.50 | | | 50.00 |
| Image plane | ∞ | | | | |

Aspherical surface data

Tenth surface

K = 0.00000e+000   A4 = −5.45965e−006   A6 = 7.87686e−009
A8 = 2.87553e−010

Eleventh surface

K = 0.00000e+000   A4 = 2.17971e−005   A6 = 1.91839e−008

Sixteenth surface

K = 0.00000e+000   A4 = 1.86223e−005   A6 = 9.60648e−009

-continued

Numerical Embodiment 3
Unit mm

A8 = 5.82734e−009

Eighteenth surface

K = 0.00000e+000   A4 = −7.38491e−006   A6 = 2.81808e−007
A8 = −2.65515e−009

Twenty-fourth surface

K = 0.00000e+000   A4 = −8.11999e−006   A6 = 5.23648e−008
A8 = −4.49597e−010   A10 = 1.71410e−012

Various data
Zoom ratio 4.71

| | Wide angle | Intermediate | Telephoto |
|---|---|---|---|
| Focal length | 15.45 | 34.76 | 72.80 |
| F-number | 2.06 | 4.00 | 5.04 |
| Half angle of view (degree) | 35.79 | 21.45 | 10.63 |
| Image height | 11.14 | 13.66 | 13.66 |
| Total lens length | 89.98 | 91.94 | 115.00 |
| BF (in air) | 6.28 | 15.52 | 22.55 |
| d3 | 1.20 | 10.04 | 30.01 |
| d9 | 27.45 | 8.90 | 0.33 |
| d17 | 3.05 | 9.40 | 11.55 |
| d20 | 7.19 | 6.24 | 8.86 |
| d22 | 5.26 | 2.29 | 2.16 |
| d24 | 3.00 | 12.24 | 19.27 |
| Entrance pupil position | 24.84 | 37.77 | 88.88 |
| Exit pupil position | −23.71 | −36.98 | −50.53 |
| Front principal point position | 30.43 | 40.29 | 57.82 |
| Rear principal point position | −14.95 | −34.26 | −72.30 |

Zoom lens unit data

| Unit | First surface | Focal length | Lens structure length | Front principal point position | Rear principal point position |
|---|---|---|---|---|---|
| L1 | 1 | 95.81 | 5.90 | −0.62 | −3.88 |
| L2 | 4 | −19.59 | 12.00 | 0.39 | −9.69 |
| L3 | 10 | 21.83 | 14.13 | −0.96 | −10.93 |
| L4 | 18 | −48.58 | 1.82 | 1.44 | 0.43 |
| L5 | 21 | 28.99 | 3.73 | 1.06 | −1.18 |
| L6 | 23 | −48.31 | 1.30 | −0.04 | −0.74 |
| G | 25 | ∞ | 3.45 | 1.39 | −1.39 |

Single lens data

| Lens | First surface | Focal length |
|---|---|---|
| 1 | 1 | −194.48 |
| 2 | 2 | 63.51 |
| 3 | 4 | −19.84 |
| 4 | 6 | −44.87 |
| 5 | 8 | 47.75 |
| 6 | 10 | 23.86 |
| 7 | 12 | 41.36 |
| 8 | 13 | −18.77 |
| 9 | 15 | 36.54 |
| 10 | 18 | −28.81 |
| 11 | 19 | 67.79 |
| 12 | 21 | 28.99 |
| 13 | 23 | −48.31 |
| 14 | 25 | 0.00 |
| 15 | 27 | 0.00 |

Numerical Embodiment 4
Unit mm

Surface data

| Surface number | r | d | nd | vd | Effective diameter |
|---|---|---|---|---|---|
| 1 | 60.712 | 1.40 | 1.92286 | 18.9 | 39.01 |
| 2 | 45.170 | 5.03 | 1.77250 | 49.6 | 37.80 |
| 3 | 722.300 | (Variable) | | | 37.25 |
| 4 | 5,825.642 | 1.10 | 1.83481 | 42.7 | 30.71 |
| 5 | 15.973 | 7.67 | | | 23.49 |
| 6 | −34.362 | 0.90 | 1.72916 | 54.7 | 23.23 |
| 7 | 1,116.471 | 0.10 | | | 23.31 |
| 8 | 39.874 | 2.18 | 1.95906 | 17.5 | 23.42 |
| 9 | 210.086 | (Variable) | | | 23.23 |
| 10* | 16.017 | 4.34 | 1.74330 | 49.3 | 18.89 |
| 11* | 206.851 | 0.47 | | | 18.18 |
| 12 | 13.055 | 3.40 | 1.49700 | 81.5 | 16.37 |
| 13 | 35.589 | 0.60 | 1.84666 | 23.8 | 15.16 |
| 14 | 10.762 | 1.92 | | | 13.43 |
| 15 | 28.934 | 1.88 | 1.55332 | 71.7 | 13.35 |
| 16* | −105.959 | 1.40 | | | 13.03 |
| 17 (Stop) | ∞ | (variable) | | | 12.30 |
| 18* | 65.875 | 0.80 | 1.85135 | 40.1 | 12.05 |
| 19 | 17.641 | 1.11 | 1.80809 | 22.8 | 12.40 |
| 20 | 27.098 | (Variable) | | | 12.57 |
| 21 | 28.494 | 3.88 | 1.69680 | 55.5 | 18.30 |
| 22 | −38.147 | (Variable) | | | 18.53 |
| 23 | −27.169 | 1.20 | 1.85135 | 40.1 | 18.38 |
| 24* | −160.238 | (Variable) | | | 19.17 |
| 25 | ∞ | 1.03 | 1.51633 | 64.1 | 50.00 |
| 26 | ∞ | 1.49 | | | 50.00 |
| 27 | ∞ | 0.92 | 1.51633 | 64.1 | 50.00 |
| 28 | ∞ | 0.50 | | | 50.00 |
| Image plane | ∞ | | | | |

Aspherical surface data

Tenth surface

K = 0.00000e+000   A4 = −3.11993e−006   A6 = −1.04135e−008
A8 = 3.77325e−010

Eleventh surface

K = 0.00000e+000   A4 = 2.38275e−005   A6 = −6.90804e−009

Sixteenth surface

K = 0.00000e+000   A4 = 3.00443e−005   A6 = 9.19740e−009
A8 = 1.16771e−008

Eighteenth surface

K = 0.00000e+000   A4 = −6.91808e−006   A6 = 3.15669e−007
A8 = −3.00652e−009

Twenty-fourth surface

K = 0.00000e+000   A4 = −5.86810e−006   A6 = 7.17359e−008
A8 = −2.50306e−010   A10 = −8.26182e−013

Various data
Zoom ratio 4.71

| | Wide angle | Intermediate | Telephoto |
|---|---|---|---|
| Focal length | 15.45 | 32.76 | 72.80 |
| F-number | 2.06 | 4.00 | 5.04 |
| Half angle of view (degree) | 35.79 | 22.63 | 10.63 |
| Image height | 11.14 | 13.66 | 13.66 |
| Total lens length | 89.01 | 88.49 | 114.92 |
| BF (in air) | 6.52 | 18.26 | 21.47 |
| d3 | 1.07 | 6.74 | 29.50 |
| d9 | 26.32 | 8.38 | 0.30 |
| d17 | 3.00 | 7.89 | 10.84 |
| d20 | 5.29 | 2.80 | 4.19 |
| d22 | 2.75 | 2.59 | 2.50 |
| d24 | 7.28 | 16.79 | 24.26 |
| Entrance pupil position | 24.66 | 32.05 | 91.11 |
| Exit pupil position | −24.46 | −35.56 | −47.87 |

Numerical Embodiment 4
Unit mm

|  | | | |
|---|---|---|---|
| Front principal point position | 30.55 | 35.05 | 54.34 |
| Rear principal point position | −14.95 | −32.26 | −72.30 |

Zoom lens unit data

| Unit | First surface | Focal length | Lens structure length | Front principal point position | Rear principal point position |
|---|---|---|---|---|---|
| L1 | 1 | 91.85 | 6.43 | −0.57 | −4.12 |
| L2 | 4 | −18.27 | 11.94 | 0.78 | −9.20 |
| L3 | 10 | 22.16 | 14.00 | −1.49 | −11.27 |
| L4 | 18 | −52.70 | 1.91 | 1.70 | 0.63 |
| L5 | 21 | 23.98 | 3.88 | 1.00 | −1.34 |
| L6 | 23 | −38.59 | 1.20 | −0.13 | −0.78 |
| G | 25 | ∞ | 3.45 | 1.39 | −1.39 |

Single lens data

| Lens | First surface | Focal length |
|---|---|---|
| 1 | 1 | −199.84 |
| 2 | 2 | 62.17 |
| 3 | 4 | −19.19 |
| 4 | 6 | −45.70 |
| 5 | 8 | 51.00 |
| 6 | 10 | 23.13 |
| 7 | 12 | 39.51 |
| 8 | 13 | −18.43 |
| 9 | 15 | 41.28 |
| 10 | 18 | −28.52 |
| 11 | 19 | 59.43 |
| 12 | 21 | 23.98 |
| 13 | 23 | −38.59 |
| 14 | 25 | 0.00 |
| 15 | 27 | 0.00 |

Numerical Embodiment 5
Unit mm

Surface data

| Surface number | r | d | nd | vd | Effective diameter |
|---|---|---|---|---|---|
| 1 | 61.195 | 1.40 | 1.92286 | 18.9 | 39.00 |
| 2 | 45.342 | 5.00 | 1.77250 | 49.6 | 37.80 |
| 3 | 708.458 | (Variable) | | | 37.25 |
| 4 | 2,276.734 | 1.10 | 1.83481 | 42.7 | 30.64 |
| 5 | 15.917 | 7.43 | | | 23.44 |
| 6 | −34.327 | 0.90 | 1.72916 | 54.7 | 23.31 |
| 7 | 4,675.090 | 0.10 | | | 23.39 |
| 8 | 39.090 | 2.18 | 1.95906 | 17.5 | 23.49 |
| 9 | 190.336 | (Variable) | | | 23.29 |
| 10* | 16.171 | 4.27 | 1.74330 | 49.3 | 18.85 |
| 11* | 178.302 | 0.50 | | | 18.14 |
| 12 | 13.343 | 3.54 | 1.49700 | 81.5 | 16.42 |
| 13 | 37.333 | 0.60 | 1.84666 | 23.8 | 15.11 |
| 14 | 10.979 | 1.52 | | | 13.44 |
| 15 | 28.967 | 2.17 | 1.55332 | 71.7 | 13.44 |
| 16* | −91.820 | 1.21 | | | 13.05 |
| 17 (Stop) | ∞ | (Variable) | | | 12.40 |
| 18* | 66.130 | 0.80 | 1.85135 | 40.1 | 11.99 |
| 19 | 17.651 | 1.12 | 1.80809 | 22.8 | 12.34 |
| 20 | 27.246 | (Variable) | | | 12.52 |
| 21 | 28.806 | 3.85 | 1.69680 | 55.5 | 18.34 |
| 22 | −38.270 | 2.00 | | | 18.57 |
| 23 | −25.898 | 1.20 | 1.85135 | 40.1 | 18.43 |
| 24* | −126.060 | (Variable) | | | 19.26 |
| 25 | ∞ | 1.03 | 1.51633 | 64.1 | 50.00 |
| 26 | ∞ | 1.49 | | | 50.00 |
| 27 | ∞ | 0.92 | 1.51633 | 64.1 | 50.00 |
| 28 | ∞ | 0.50 | | | 50.00 |
| Image plane | ∞ | | | | |

Aspherical surface data

Tenth surface

K = 0.00000e+000  A4 = −3.34204e−006  A6 = −7.97084e−010
A8 = 4.26623e−010

Eleventh surface

K = 0.00000e+000  A4 = 2.28153e−005  A6 = 5.21819e−009

Sixteenth surface

K = 0.00000e+000  A4 = 3.04877e−005  A6 = 2.81087e−008
A8 = 1.12344e−008

Eighteenth surface

K = 0.00000e+000  A4 = −5.73311e−006  A6 = 2.87882e−007
A8 = −2.76272e−009

Twenty-fourth surface

K = 0.00000e+000  A4 = −7.40763e−006  A6 = 1.08486e−007
A8 = −8.91286e−010  A10 = 2.61926e−012

Various data
Zoom ratio 4.71

|  | Wide angle | Intermediate | Telephoto |
|---|---|---|---|
| Focal length | 15.45 | 31.78 | 72.80 |
| F-number | 2.06 | 4.00 | 5.04 |
| Half angle of view (degree) | 35.79 | 23.26 | 10.63 |
| Image height | 11.14 | 13.66 | 13.66 |
| Total lens length | 89.22 | 86.34 | 114.55 |
| BF (in air) | 6.28 | 17.70 | 20.68 |
| d3 | 1.04 | 4.82 | 29.92 |
| d9 | 26.78 | 8.66 | 0.30 |
| d17 | 3.00 | 8.05 | 10.68 |
| d20 | 5.43 | 2.78 | 4.14 |
| d24 | 7.11 | 16.18 | 23.67 |
| Entrance pupil position | 24.54 | 28.36 | 90.94 |
| Exit pupil position | −24.54 | −35.20 | −47.05 |
| Front principal point position | 30.46 | 31.85 | 52.29 |
| Rear principal point position | −14.95 | −31.28 | −72.30 |

Zoom lens unit data

| Unit | First surface | Focal length | Lens structure length | Front principal point position | Rear principal point position |
|---|---|---|---|---|---|
| L1 | 1 | 92.95 | 6.40 | −0.58 | −4.12 |
| L2 | 4 | −18.52 | 11.72 | 0.71 | −9.06 |
| L3 | 10 | 22.22 | 13.81 | −1.63 | −10.98 |
| L4 | 18 | −53.01 | 1.92 | 1.71 | 0.64 |
| L5 | 21 | 50.26 | 8.05 | −4.43 | −9.48 |
| G | 25 | ∞ | 3.45 | 1.39 | −1.39 |

Single lens data

| Lens | First surface | Focal length |
|---|---|---|
| 1 | 1 | −198.06 |
| 2 | 2 | 62.50 |
| 3 | 4 | −19.21 |
| 4 | 6 | −46.73 |
| 5 | 8 | 50.93 |
| 6 | 10 | 23.66 |

Numerical Embodiment 5
Unit mm

| | | |
|---|---|---|
| 7 | 12 | 39.83 |
| 8 | 13 | −18.56 |
| 9 | 15 | 40.05 |
| 10 | 18 | −28.50 |
| 11 | 19 | 58.96 |
| 12 | 21 | 24.16 |
| 13 | 23 | −38.50 |
| 14 | 25 | 0.00 |
| 15 | 27 | 0.00 |

Numerical Embodiment 6
Unit mm

Surface data

| Surface number | r | d | nd | vd | Effective diameter |
|---|---|---|---|---|---|
| 1 | 56.514 | 1.40 | 1.92286 | 18.9 | 38.50 |
| 2 | 42.943 | 4.57 | 1.77250 | 49.6 | 37.21 |
| 3 | 227.096 | (Variable) | | | 36.64 |
| 4 | −510.374 | 1.10 | 1.85150 | 40.8 | 30.64 |
| 5 | 17.564 | 7.46 | | | 24.35 |
| 6 | −43.986 | 0.90 | 1.72916 | 54.7 | 24.01 |
| 7 | −19,884.087 | 0.30 | | | 24.07 |
| 8 | 40.200 | 2.23 | 1.95906 | 17.5 | 24.17 |
| 9 | 177.373 | (Variable) | | | 23.95 |
| 10* | 16.740 | 2.84 | 1.77250 | 49.5 | 14.92 |
| 11* | 96.620 | 0.50 | | | 14.43 |
| 12 | 12.646 | 3.40 | 1.49700 | 81.5 | 13.56 |
| 13 | 36.170 | 0.60 | 1.92119 | 24.0 | 12.23 |
| 14 | 12.194 | 1.22 | | | 11.34 |
| 15 | 50.824 | 1.90 | 1.55332 | 71.7 | 11.31 |
| 16* | −43.104 | 2.57 | | | 11.01 |
| 17 (Stop) | ∞ | 3.00 | | | 11.88 |
| 18* | 73.124 | 0.80 | 1.85135 | 40.1 | 13.00 |
| 19 | 19.352 | 1.00 | 1.80809 | 22.8 | 13.00 |
| 20 | 28.960 | 3.50 | | | 13.00 |
| 21 | 84.348 | 3.50 | 1.69680 | 55.5 | 16.50 |
| 22 | −19.712 | 4.13 | | | 16.95 |
| 23 | −14.672 | 1.20 | 1.85135 | 40.1 | 16.91 |
| 24* | −36.493 | (Variable) | | | 18.44 |
| 25 | ∞ | 1.03 | 1.51633 | 64.1 | 50.00 |
| 26 | ∞ | 1.49 | | | 50.00 |
| 27 | ∞ | 0.92 | 1.51633 | 64.1 | 50.00 |
| 28 | ∞ | 0.50 | | | 50.00 |
| Image plane | ∞ | | | | |

Aspherical surface data

Tenth surface

K = 0.00000e+000   A4 = 1.94576e−005   A6 = 6.20163e−008
A8 = 2.01056e−009   A10 = −1.98253e−012

Eleventh surface

K = 0.00000e+000   A4 = 3.86041e−005   A6 = 2.71870e−008

Sixteenth surface

K = 0.00000e+000   A4 = 7.66946e−005   A6 = 4.20654e−007
A8 = 1.82438e−008

Eighteenth surface

K = 0.00000e+000   A4 = 6.43642e−006   A6 = 1.58463e−008
A8 = −5.78829e−010

Twenty-fourth surface

K = 0.00000e+000   A4 = −2.36947e−005   A6 = 6.01058e−008
A8 = −2.25893e−009   A10 = 1.34476e−011

Various data
Zoom ratio 3.96

Numerical Embodiment 6
Unit mm

| | Wide angle | Intermediate | Telephoto |
|---|---|---|---|
| Focal length | 15.96 | 31.06 | 63.20 |
| F-number | 2.47 | 4.12 | 5.76 |
| Half angle of view (degree) | 35.63 | 23.85 | 12.49 |
| Image height | 11.44 | 13.73 | 14.00 |
| Total lens length | 87.92 | 86.14 | 105.87 |
| BF (in air) | 6.28 | 17.25 | 24.35 |
| d3 | 1.94 | 8.98 | 29.32 |
| d9 | 27.67 | 9.88 | 0.30 |
| d24 | 6.93 | 15.21 | 24.18 |
| Entrance pupil position | 26.89 | 36.15 | 82.87 |
| Exit pupil position | −21.46 | −30.43 | −39.41 |
| Front principal point position | 31.25 | 36.02 | 45.99 |
| Rear principal point position | −15.46 | −30.6 | −62.70 |

Zoom lens unit data

| Unit | First surface | Focal length | Lens structure length | Front principal point position | Rear principal point position |
|---|---|---|---|---|---|
| L1 | 1 | 103.93 | 5.97 | −1.44 | −4.68 |
| L2 | 4 | −21.41 | 11.98 | 0.02 | −10.26 |
| L3 | 10 | 21.55 | 30.17 | −4.23 | −23.76 |
| 5 | 25 | ∞ | 3.45 | 1.39 | −1.39 |

Single lens data

| Lens | First surface | Focal length |
|---|---|---|
| 1 | 1 | −203.87 |
| 2 | 2 | 67.82 |
| 3 | 4 | −19.92 |
| 4 | 6 | −60.46 |
| 5 | 8 | 53.77 |
| 6 | 10 | 25.81 |
| 7 | 12 | 37.34 |
| 8 | 13 | −20.21 |
| 9 | 15 | 42.46 |
| 10 | 18 | −31.13 |
| 11 | 19 | 68.97 |
| 12 | 21 | 23.25 |
| 13 | 23 | −29.57 |
| 14 | 25 | 0.00 |
| 15 | 27 | 0.00 |

TABLE 1

| Conditional expression | Upper limit | Lower limit | Embodiment 1 | 2 | 3 | 4 | 5 | 6 |
|---|---|---|---|---|---|---|---|---|
| (1) | 0.0 | 0.75 | 0.251 | 0.322 | 0.242 | 0.262 | 0.263 | 0.260 |
| (2) | 3.0 | 22.0 | 4.575 | 5.362 | 6.201 | 5.945 | 6.016 | 6.512 |
| (3) | 0.5 | 1.5 | 1.242 | 0.848 | 1.051 | 0.985 | 0.984 | 1.014 |
| (4) | 0.8 | 2.0 | 1.084 | 1.191 | 1.268 | 1.183 | 1.119 | 1.342 |
| (5) | 0.8 | 2.5 | 1.116 | 1.490 | 1.413 | 1.434 | 1.438 | 1.350 |
| (6) | 0.1 | 1.0 | 0.386 | 0.403 | 0.407 | 0.422 | 0.407 | 0.394 |
| (7) | −1.5 | −0.5 | −1.098 | −1.041 | −0.983 | −1.005 | −1.014 | −0.933 |
| (8) | −1.0 | −0.1 | −0.165 | −0.656 | −0.561 | −0.547 | −0.553 | −0.455 |
| (9) | 1.0 | 5.0 | 1.690 | 2.477 | 3.127 | 2.498 | 2.492 | 1.853 |
| (10) | 1.5 | 10.0 | — | — | — | — | 3.253 | 4.141 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-001439, filed Jan. 7, 2015, which is hereby incorporated by reference herein in its entirety.

What is claimed is:

1. A zoom lens comprising, in order from an object side to an image side:
   a first lens unit providing a positive refractive power;
   a second lens unit providing a negative refractive power; and
   a rear lens providing a positive refractive power over an entire zoom range,
   wherein an interval between each pair of adjacent lens units changes during zooming,
   wherein the rear lens group includes:
      a partial lens system LRp1 providing a positive refractive power and disposed closest to the object side in the rear lens group, the partial lens system LRp1 including at least first and second positive lenses and at least one negative lens;
      an aperture stop disposed on the image side of the partial lens system LRp1; and
      at least one lens unit providing a negative refractive power and disposed between the aperture stop and an image plane,
   wherein the first lens unit and the aperture stop are configured to be positioned closer to the object side at a telephoto end than at a wide angle end, and
   wherein the following conditional expressions are satisfied:

$0.00 < fssFw/LssFw < 0.75$; and $3.0 < f1/fw < 20.0$, where fssFw represents a combined focal length of a front lens system consisting of all lenses disposed on the object side of the aperture stop at the wide angle end, LssFw represents an absolute value of a distance on an optical axis from a first lens surface closest to the object side in the zoom lens to the aperture stop at the wide angle end, f1 represents a focal length of the first lens unit, and fw represents a focal length of the zoom lens at the wide angle end.

2. The zoom lens according to claim 1, wherein the following conditional expression is satisfied:

$0.5 < \beta ssRw < 1.5$ where $\beta ssRw$ represents a combined lateral magnification of a rear lens system consisting of all lenses disposed on the image side of the aperture stop at the wide angle end.

3. The zoom lens according to claim 1, wherein the following conditional expression is satisfied:

$0.8 < |f2|/fw < 2.0$, where f2 represents a focal length of the second lens unit.

4. The zoom lens according to claim 1, wherein the following conditional expression is satisfied:

$0.8 < fRp1/fw < 2.5$, where fRp1 represents a focal length of the partial lens system LRp1.

5. The zoom lens according to claim 1, wherein the following conditional expression is satisfied:

$0.1 < skw/fw < 1.0$, where skw represents a backfocus of the zoom lens at the wide angle end.

6. The zoom lens according to claim 1, wherein:
   the second lens unit includes a negative lens G21n closest to the object side, and
   the following conditional expression is satisfied:

$-1.5 < (R2nb+R2na)/(R2nb-R2na) < -0.5$, where R2na represents a curvature radius of a lens surface of the negative lens G21n on the object side, and R2nb represents a curvature radius of a lens surface of the negative lens G21n on the image side.

7. The zoom lens according to claim 1, wherein:
   the partial lens system LRp1 includes in order from the object side to the image side:
      a partial lens system LRp1a consisting of the first positive lens; and
      a partial lens system LRp1b including the second positive lens and the at least one negative lens, and
   the following conditional expression is satisfied:

$-1.0 < fRp1a/fRp1b < -0.1$, where fRp1a represents a focal length of the partial lens system LRp1a, and fRp1b represents a focal length of the partial lens system LRp1b.

8. The zoom lens according to claim 1, wherein the rear lens group includes a lens unit providing a negative refractive power and disposed closest to the image side.

9. The zoom lens according to claim 1, wherein:
   the rear lens group includes a lens unit disposed closest to the image side, and
   the following conditional expression is satisfied:

$1.0 < |fRn2|/fw < 5.0$, where fRn2 represents a focal length of the lens unit of the rear lens group disposed closest to the image side.

10. The zoom lens according to claim 1, wherein the rear lens group includes a lens unit consisting of a single lens disposed closest to the image side and providing a negative refractive power.

11. The zoom lens according to claim 1, wherein the rear lens group includes in order from the object side to the image side:
a third lens unit corresponding to the partial lens system LRp1;
the aperture stop;
a fourth lens unit corresponding to the at least one lens unit disposed between the aperture stop and an image plane;
a fifth lens unit providing a positive refractive power; and
a sixth lens unit providing a negative refractive power.

12. The zoom lens according to claim 11, wherein the aperture stop is configured to move along the same locus as a locus of the third lens unit toward the object side during zooming from the wide angle end to the telephoto end.

13. An image pickup apparatus comprising:
a zoom lens; and
a solid-state image pickup element configured to receive light of an image formed by the zoom lens,
wherein the zoom lens comprises in order from an object side to an image side:
a first lens unit providing a positive refractive power;
a second lens unit providing a negative refractive power; and
a rear lens group providing a positive refractive power over an entire zoom range,
wherein an interval between each pair of adjacent lens units is changed changes during zooming,
wherein the rear lens group includes:
a partial lens system LRp1 providing a positive refractive power and disposed closest to the object side in the rear lens group, the partial lens system LRp1 including at least two positive lenses and at least one negative lens;
an aperture stop disposed on the image side of the partial lens system LRp1; and
at least one lens unit providing a negative refractive power and disposed between the aperture stop and an image plane,
wherein the first lens unit and the aperture stop are configured to be positioned closer to the object side at a telephoto end than at a wide angle end, and
wherein the following conditional expressions are satisfied:

$0.00 < fssFw/LssFw < 0.75$; and $3.0 < f1/fw < 20.0$, where fssFw represents a combined focal length of a front lens system consisting of all lenses disposed on the object side of to the aperture stop at the wide angle end, LssFw represents an absolute value of a distance on an optical axis from a first lens surface closest to the object side in the zoom lens to the aperture stop at the wide angle end, f1 represents a focal length of the first lens unit, and fw represents a focal length of the zoom lens at the wide angle end.

14. A zoom lens comprising, in order from an object side to an image side:
a first lens unit providing a positive refractive power;
a second lens unit providing a negative refractive power; and
a rear lens group providing a positive refractive power over an entire zoom range,
wherein an interval between each pair of adjacent lens units changes during zooming,
wherein the rear lens group includes, in order from the object side to the image side:
a third lens unit providing a positive refractive power;
an aperture stop;
a fourth lens unit providing a negative refractive power;
a fifth lens unit providing a positive refractive power; and
a sixth lens unit providing a negative refractive power,
wherein the first lens unit and the aperture stop are configured to be positioned closer to the object side at a telephoto end than at a wide angle end, and
wherein the following conditional expressions are satisfied:

$0.00 < fssFw/LssFw < 0.75$; and $3.0 < f1/fw < 20.0$, where fssFw represents a combined focal length of a front lens system consisting of all lenses disposed on the object side of the aperture stop at the wide angle end, LssFw represents an absolute value of a distance on an optical axis from a first lens surface closest to the object side in the zoom lens to the aperture stop at the wide angle end, f1 represents a focal length of the first lens unit, and fw represents a focal length of the zoom lens at the wide angle end.

15. The zoom lens according to claim 14, wherein the aperture stop is configured to move along the same locus as a locus of the third lens unit toward the object side during zooming from the wide angle end to the telephoto end.

16. An image pickup apparatus comprising:
a zoom lens; and
a solid-state image pickup element configured to receive light of an image formed by the zoom lens,
wherein the zoom lens comprises, in order from an object side to an image side:
a first lens unit providing a positive refractive power;
a second lens unit providing a negative refractive power; and
a rear lens group providing a positive refractive power over an entire zoom range,
wherein an interval between each pair of adjacent lens units changes during zooming,
wherein the rear lens group includes, in order from the object side to the image side:
a third lens unit providing a positive refractive power;
an aperture stop;
a fourth lens unit providing a negative refractive power;
a fifth lens unit providing a positive refractive power; and
a sixth lens unit providing a negative refractive power,
wherein the first lens unit and the aperture stop are configured to be positioned closer to the object side at a telephoto end than at a wide angle end, and
wherein the following conditional expressions are satisfied:

$0.00 < fssFw/LssFw < 0.75$; and $3.0 < f1/fw < 20.0$, where fssFw represents a combined focal length of a front lens system consisting of all lenses disposed on the object side of the aperture stop at the wide angle end, LssFw represents an absolute value of a distance on an optical axis from a first lens surface closest to the object side in the zoom lens to the aperture stop at the wide angle end, f1 represents a focal length of the first lens unit, and fw represents a focal length of the zoom lens at the wide angle end.

\* \* \* \* \*